(12) United States Patent
Kowalczyk et al.

(10) Patent No.: US 11,009,671 B2
(45) Date of Patent: May 18, 2021

(54) FIBER OPTIC ASSEMBLY WITH CABLE STORAGE ARRANGEMENT

(71) Applicant: CommScope Technologies LLC, Hickory, NC (US)

(72) Inventors: Scott C. Kowalczyk, Savage, MN (US); Trevor D. Smith, Eden Prairie, MN (US); Jonathan R. Kaml, Shakopee, MN (US); Thomas G. LeBlanc, Westminster, MA (US); Ronald A. Beck, Naples, FL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/388,874

(22) Filed: Dec. 22, 2016

(65) Prior Publication Data

US 2017/0235079 A1 Aug. 17, 2017

Related U.S. Application Data

(63) Continuation of application No. 14/703,446, filed on May 4, 2015, now Pat. No. 9,535,227, which is a (Continued)

(51) Int. Cl.
*G02B 6/44* (2006.01)
*G02B 6/38* (2006.01)
*G02B 6/46* (2006.01)

(52) U.S. Cl.
CPC ......... *G02B 6/4457* (2013.01); *G02B 6/3897* (2013.01); *G02B 6/4452* (2013.01); (Continued)

(58) Field of Classification Search
CPC .. G02B 6/4457; G02B 6/3897; G02B 6/4452; G02B 6/4471; G02B 6/4477; G02B 6/4478; G02B 6/46
See application file for complete search history.

(56) References Cited

U.S. PATENT DOCUMENTS 1,276,825 A 8/1918 Swope
1,442,999 A 1/1923 Boardman et al.
(Continued)

FOREIGN PATENT DOCUMENTS

CN 1799296 A 7/2006
DE 42 26 368 A1 2/1994
(Continued)

OTHER PUBLICATIONS

"V-Linx™ EZ-Spool Combiner", Furukawa Electric North America, Copyright © 2007.
(Continued)

*Primary Examiner* — Peter Radkowski
(74) *Attorney, Agent, or Firm* — Merchant & Gould P.C.

(57) ABSTRACT

A fiber optic telecommunications device includes an enclosure defining an interior. A first fiber optic adapter is provided at the enclosure. A spool is provided at an exterior of the enclosure. A fiber optic cable, which includes a first optical fiber, is wrapped around the spool. A first fiber optic connector is mounted at a first end of the first optical fiber. The first end of the first optical fiber is positioned within the interior of the enclosure. The first fiber optic connector is inserted within the first fiber optic adapter. The enclosure and the spool are configured to rotate in unison about a common axis when the fiber optic cable is unwound from the spool.

18 Claims, 29 Drawing Sheets

Related U.S. Application Data continuation of application No. 13/743,967, filed on Jan. 17, 2013, now Pat. No. 9,057,860, which is a continuation of application No. 13/348,133, filed on Jan. 11, 2012, now Pat. No. 8,380,035, which is a continuation of application No. 12/715,855, filed on Mar. 2, 2010, now Pat. No. 8,131,126, which is a continuation of application No. 12/113,786, filed on May 1, 2008, now Pat. No. 7,715,679.

(60) Provisional application No. 60/916,495, filed on May 7, 2007, provisional application No. 60/954,210, filed on Aug. 6, 2007, provisional application No. 61/037,223, filed on Mar. 17, 2008.

(52) U.S. Cl.
CPC ......... *G02B 6/4466* (2013.01); *G02B 6/4471* (2013.01); *G02B 6/4477* (2013.01); *G02B 6/4478* (2013.01); *G02B 6/46* (2013.01); *Y10T 29/49826* (2015.01)

(56) References Cited

U.S. PATENT DOCUMENTS

| | | | | |
|---|---|---|---|---|
| 1,446,410 | A | 2/1923 | McCormick et al. | |
| 1,474,580 | A | 11/1923 | Clark et al. | |
| RE20,995 | E | 2/1939 | Beasley | |
| 2,282,156 | A * | 5/1942 | Benes | A01K 89/01931 242/118.4 |
| 2,434,363 | A | 1/1948 | Lenox | |
| 2,502,496 | A | 4/1950 | Wickman | |
| 2,521,226 | A * | 9/1950 | Keller | H02G 11/02 174/135 |
| 2,727,703 | A | 12/1955 | Bonnett | |
| 2,767,426 | A * | 10/1956 | Grupp | E05D 13/1292 16/198 |
| 3,091,433 | A | 5/1963 | Riley | |
| 3,131,729 | A | 5/1964 | Rudolf et al. | |
| 3,346,705 | A * | 10/1967 | Slinkard | H02G 11/02 191/12.4 |
| 3,433,579 | A * | 3/1969 | Runnion | A61L 2/10 250/455.11 |
| 3,585,324 | A | 6/1971 | Renndorfer et al. | |
| 3,612,424 | A * | 10/1971 | Friedel | G03B 27/588 242/348.4 |
| 3,657,491 | A | 4/1972 | Ryder et al. | |
| 3,667,417 | A | 6/1972 | Clinkenbeard | |
| 3,837,448 | A * | 9/1974 | Hagstrom | B65H 75/40 191/12.2 R |
| 3,920,308 | A | 11/1975 | Murray | |
| 3,940,086 | A | 2/1976 | Stoquelet | |
| 3,983,977 | A * | 10/1976 | Crabb | B65H 75/406 191/12.4 |
| 4,053,118 | A * | 10/1977 | Aikins | B65H 75/38 191/12.2 R |
| 4,081,258 | A | 3/1978 | Goell et al. | |
| 4,138,177 | A | 2/1979 | van Valer | |
| 4,143,746 | A * | 3/1979 | Lowery | B65H 75/406 191/12.4 |
| 4,201,278 | A | 5/1980 | Balde | |
| 4,282,954 | A | 8/1981 | Hill | |
| 4,379,615 | A | 4/1983 | Toda et al. | |
| 4,384,688 | A | 5/1983 | Smith | |
| 4,470,558 | A * | 9/1984 | Stamper | D06F 53/045 242/378 |
| 4,520,239 | A * | 5/1985 | Schwartz | H02G 11/02 191/12.4 |
| 4,587,801 | A | 5/1986 | Missout et al. | |
| 4,635,875 | A | 1/1987 | Apple | |
| 4,657,140 | A * | 4/1987 | Zagar | B65H 75/14 206/397 |
| 4,666,237 | A * | 5/1987 | Mallinson | B23Q 17/2266 385/136 |
| 4,669,705 | A | 6/1987 | Langston | |
| 4,767,073 | A | 8/1988 | Malzacher | |
| 4,846,343 | A | 7/1989 | Rupert | |
| 4,869,437 | A | 9/1989 | Berz | |
| 4,880,182 | A | 11/1989 | Gelfman | |
| 4,883,337 | A | 11/1989 | Dahlgren | |
| 4,913,369 | A | 4/1990 | Lia et al. | |
| 4,938,432 | A | 7/1990 | Kurt et al. | |
| 4,939,798 | A | 7/1990 | Last | |
| 4,940,859 | A * | 7/1990 | Peterson | H01R 13/72 191/12.2 R |
| 4,953,194 | A | 8/1990 | Hansen et al. | |
| 4,953,810 | A * | 9/1990 | Stadig | B65H 49/28 242/129 |
| 4,968,929 | A | 11/1990 | Hauck et al. | |
| 4,978,310 | A | 12/1990 | Shichida | |
| 4,989,582 | A | 2/1991 | Sakiyama et al. | |
| 5,013,121 | A | 5/1991 | Anton et al. | |
| 5,016,554 | A * | 5/1991 | Harris, Jr. | E02B 3/26 114/219 |
| 5,052,940 | A | 10/1991 | Bengal | |
| 5,066,149 | A | 11/1991 | Wheeler et al. | |
| 5,066,256 | A | 11/1991 | Ward, Sr. | |
| 5,069,523 | A * | 12/1991 | Finzel | G02B 6/4452 385/135 |
| 5,071,211 | A * | 12/1991 | Debortoli | G02B 6/4452 174/50 |
| 5,074,863 | A | 12/1991 | Dines | |
| 5,100,221 | A | 3/1992 | Carney et al. | |
| 5,107,532 | A | 4/1992 | Hansen et al. | |
| 5,109,467 | A | 4/1992 | Hogan et al. | |
| 5,124,606 | A | 6/1992 | Eisenbeis | |
| 5,161,988 | A * | 11/1992 | Krupka | H01R 13/518 200/50.28 |
| 5,166,970 | A | 11/1992 | Ward | |
| 5,167,001 | A | 11/1992 | Debortoli et al. | |
| 5,168,969 | A | 12/1992 | Mayhew | |
| 5,172,841 | A * | 12/1992 | Friedman | A47F 13/045 225/42 |
| 5,185,843 | A | 2/1993 | Aberson et al. | |
| 5,222,164 | A | 6/1993 | Bass, Sr. et al. | |
| 5,246,377 | A * | 9/1993 | Kawahara | H01R 35/025 439/15 |
| 5,265,187 | A | 11/1993 | Morin et al. | |
| 5,265,815 | A | 11/1993 | Soyka et al. | |
| 5,280,861 | A | 1/1994 | Corriveau | |
| 5,305,405 | A | 4/1994 | Emmons et al. | |
| 5,310,356 | A * | 5/1994 | Obata | B60R 16/027 439/15 |
| 5,317,663 | A | 5/1994 | Beard et al. | |
| 5,323,479 | A | 6/1994 | Allen | |
| 5,326,040 | A | 7/1994 | Kramer | |
| 5,335,874 | A | 8/1994 | Shrum et al. | |
| 5,353,367 | A | 10/1994 | Czosnowski et al. | |
| 5,388,781 | A | 2/1995 | Sauber | |
| 5,393,249 | A | 2/1995 | Morgenstern et al. | |
| 5,394,466 | A | 2/1995 | Schneider | |
| 5,394,503 | A | 2/1995 | Dietz, Jr. et al. | |
| 5,413,494 | A | 5/1995 | Dewey et al. | |
| 5,418,334 | A | 5/1995 | Williams | |
| 5,419,717 | A | 5/1995 | Abendschein et al. | |
| 5,434,944 | A | 7/1995 | Kerry et al. | |
| 5,448,015 | A | 9/1995 | Jamet et al. | |
| 5,448,675 | A | 9/1995 | Leone et al. | |
| 5,467,062 | A | 11/1995 | Burroughs et al. | |
| 5,473,715 | A | 12/1995 | Schofield et al. | |
| 5,483,467 | A | 1/1996 | Krupka et al. | |
| 5,485,972 | A | 1/1996 | Mummery et al. | |
| 5,490,229 | A | 2/1996 | Ghandeharizadeh et al. | |
| 5,494,234 | A | 2/1996 | Kramer | |
| 5,494,446 | A | 2/1996 | DeLucia et al. | |
| 5,497,444 | A * | 3/1996 | Wheeler | G02B 6/4452 385/134 |
| 5,519,275 | A | 5/1996 | Scott et al. | |
| 5,520,346 | A | 5/1996 | Hoban | |
| 5,522,561 | A | 6/1996 | Koyamatsu et al. | |

(56) References Cited

U.S. PATENT DOCUMENTS

| | | | |
|---|---|---|---|
| 5,528,453 A * | 6/1996 | Berman | A45C 5/14 280/47.26 |
| 5,529,186 A | 6/1996 | Bass | |
| 5,544,836 A * | 8/1996 | Pera | B65H 75/48 242/372 |
| 5,551,545 A | 9/1996 | Gelfman | |
| 5,613,030 A | 3/1997 | Hoffer et al. | |
| 5,638,481 A * | 6/1997 | Arnett | G02B 6/3817 385/135 |
| 5,639,043 A | 6/1997 | Baird | |
| 5,641,067 A | 6/1997 | Ellis | |
| 5,655,726 A | 8/1997 | Peterson et al. | |
| 5,657,412 A | 8/1997 | Caudrelier | |
| 5,685,741 A | 11/1997 | Dewey et al. | |
| 5,703,990 A * | 12/1997 | Robertson | G02B 6/444 359/341.1 |
| 5,709,347 A | 1/1998 | Hoffmann et al. | |
| 5,712,942 A | 1/1998 | Jennings et al. | |
| 5,717,810 A | 2/1998 | Wheeler | |
| 5,718,397 A | 2/1998 | Stevens | |
| 5,733,141 A | 3/1998 | Penrod | |
| 5,734,774 A | 3/1998 | Morrell | |
| 5,749,148 A | 5/1998 | White, III et al. | |
| 5,773,757 A * | 6/1998 | Kenney | H01R 13/60 174/53 |
| 5,787,219 A | 7/1998 | Mueller et al. | |
| 5,821,510 A | 10/1998 | Cohen et al. | |
| 5,854,824 A | 12/1998 | Bengal et al. | |
| 5,915,062 A | 6/1999 | Jackson et al. | |
| 5,915,640 A | 6/1999 | Wagter et al. | |
| 5,957,401 A * | 9/1999 | O'Donnell | B65H 75/406 191/12.4 |
| 5,987,203 A * | 11/1999 | Abel | G02B 6/3825 385/134 |
| 5,987,207 A | 11/1999 | Hoke | |
| 5,992,787 A | 11/1999 | Burke | |
| 6,002,331 A | 12/1999 | Laor | |
| 6,035,032 A * | 3/2000 | Daoud | H04Q 1/021 379/325 |
| 6,077,108 A | 6/2000 | Lorscheider et al. | |
| 6,087,587 A | 7/2000 | Gonzalez | |
| 6,095,837 A | 8/2000 | David et al. | |
| 6,116,961 A | 9/2000 | Henneberger et al. | |
| 6,135,254 A * | 10/2000 | Liao | H02G 11/02 191/12.2 R |
| 6,176,559 B1 * | 1/2001 | Tiramani | B25H 3/023 280/47.19 |
| 6,195,494 B1 | 2/2001 | Abbott et al. | |
| 6,215,938 B1 * | 4/2001 | Reitmeier | G02B 6/4441 385/134 |
| 6,220,413 B1 * | 4/2001 | Walters | G02B 6/4457 191/12.4 |
| 6,220,762 B1 * | 4/2001 | Kanai | G02B 6/3825 385/53 |
| 6,222,908 B1 | 4/2001 | Bartolutti et al. | |
| 6,222,975 B1 | 4/2001 | Gilbert et al. | |
| 6,223,675 B1 * | 5/2001 | Watt | B63G 8/001 114/312 |
| 6,234,830 B1 | 5/2001 | Ensz et al. | |
| 6,238,235 B1 | 5/2001 | Shavit et al. | |
| 6,243,526 B1 | 6/2001 | Garibay et al. | |
| 6,285,293 B1 | 9/2001 | German et al. | |
| 6,286,777 B1 * | 9/2001 | Black | B65H 75/06 242/388.6 |
| 6,300,877 B1 | 10/2001 | Schannach et al. | |
| 6,315,598 B1 * | 11/2001 | Elliot | G02B 6/4457 439/456 |
| 6,330,148 B1 | 12/2001 | Won et al. | |
| 6,330,307 B1 | 12/2001 | Bloch et al. | |
| 6,349,893 B1 | 2/2002 | Daoud | |
| 6,350,148 B1 | 2/2002 | Bartolutti et al. | |
| 6,361,360 B1 * | 3/2002 | Hwang | G02B 6/4457 385/135 |
| 6,367,347 B1 | 4/2002 | Blaschke et al. | |
| 6,385,381 B1 | 5/2002 | Janus et al. | |
| 6,419,175 B1 * | 7/2002 | Rankin, VI | A45F 5/004 242/373 |
| 6,421,322 B1 | 7/2002 | Koziy et al. | |
| 6,424,710 B1 | 7/2002 | Bartolutti et al. | |
| 6,427,045 B1 | 7/2002 | Matthes et al. | |
| 6,427,781 B1 | 8/2002 | Buhler et al. | |
| 6,433,274 B1 | 8/2002 | Doss et al. | |
| 6,442,240 B1 | 8/2002 | Otto | |
| 6,456,768 B1 | 9/2002 | Boncek et al. | |
| 6,456,773 B1 | 9/2002 | Keys | |
| D466,479 S | 12/2002 | Pein et al. | |
| 6,494,396 B2 | 12/2002 | Sugata | |
| 6,496,641 B1 | 12/2002 | Mahony | |
| 6,499,861 B1 | 12/2002 | German et al. | |
| 6,503,097 B2 | 1/2003 | Archambault | |
| 6,511,009 B1 | 1/2003 | Harrison et al. | |
| 6,511,231 B2 | 1/2003 | Lampert et al. | |
| 6,522,737 B1 | 2/2003 | Bartolutti et al. | |
| 6,522,826 B2 * | 2/2003 | Gregory | G01C 19/722 356/450 |
| 6,533,205 B1 | 3/2003 | Kles | |
| 6,533,216 B1 | 3/2003 | Bumgarner et al. | |
| 6,554,221 B2 | 4/2003 | Hinds | |
| 6,554,484 B2 | 4/2003 | Lampert | |
| 6,574,586 B1 | 6/2003 | David et al. | |
| 6,591,051 B2 | 7/2003 | Solheid et al. | |
| 6,616,080 B1 | 9/2003 | Edwards et al. | |
| 6,625,374 B2 | 9/2003 | Holman et al. | |
| 6,626,697 B1 | 9/2003 | Martin et al. | |
| 6,631,237 B2 | 10/2003 | Knudsen et al. | |
| 6,636,152 B2 | 10/2003 | Schannach et al. | |
| 6,640,041 B2 | 10/2003 | Ichinari et al. | |
| 6,643,443 B2 | 11/2003 | Holman et al. | |
| 6,661,961 B1 | 12/2003 | Allen et al. | |
| 6,669,129 B1 | 12/2003 | Shah | |
| 6,684,179 B1 | 1/2004 | David | |
| 6,702,077 B2 | 3/2004 | Skowronski | |
| 6,711,339 B2 | 3/2004 | Puetz et al. | |
| 6,715,619 B2 | 4/2004 | Kim et al. | |
| 6,721,484 B1 | 4/2004 | Blankenship et al. | |
| 6,725,177 B2 | 4/2004 | David et al. | |
| 6,743,044 B2 | 6/2004 | Musolf et al. | |
| 6,745,971 B1 | 6/2004 | Renzoni | |
| 6,758,314 B2 * | 7/2004 | Woodruff | B65H 75/40 191/12.2 R |
| 6,760,530 B1 | 7/2004 | Mandry | |
| 6,793,408 B2 | 9/2004 | Levy et al. | |
| 6,795,633 B2 * | 9/2004 | Joseph, II | G02B 6/4457 385/135 |
| 6,802,735 B2 | 10/2004 | Pepe et al. | |
| 6,808,116 B1 | 10/2004 | Eslambolchi et al. | |
| 6,814,624 B2 | 11/2004 | Clark et al. | |
| 6,819,854 B1 * | 11/2004 | Young | G02B 6/3604 385/134 |
| 6,834,517 B1 | 12/2004 | Sheehy | |
| 6,845,207 B2 | 1/2005 | Schray | |
| 6,850,685 B2 | 2/2005 | Tinucci et al. | |
| 6,856,748 B1 | 2/2005 | Elkins, II et al. | |
| 6,885,799 B2 | 4/2005 | Lee | |
| 6,889,701 B2 | 5/2005 | Kovacik et al. | |
| 6,898,368 B2 | 5/2005 | Colombo et al. | |
| 6,901,200 B2 | 5/2005 | Schray | |
| 6,905,363 B2 | 6/2005 | Musolf et al. | |
| 6,915,058 B2 | 7/2005 | Pons | |
| 6,926,130 B2 | 8/2005 | Skowronski | |
| 6,926,449 B1 | 8/2005 | Keenum et al. | |
| 6,932,517 B2 | 8/2005 | Swayze et al. | |
| 6,933,441 B2 | 8/2005 | Fuller et al. | |
| 6,937,725 B2 | 8/2005 | Liao | |
| D510,068 S | 9/2005 | Haggay et al. | |
| 6,948,680 B2 * | 9/2005 | Ganster | B65D 85/04 206/400 |
| 6,961,675 B2 | 11/2005 | David | |
| 6,971,895 B2 | 12/2005 | Sago et al. | |
| 6,976,867 B2 | 12/2005 | Navarro et al. | |
| 6,984,387 B1 | 1/2006 | Howell et al. | |
| 6,997,410 B1 | 2/2006 | Huang | |

(56) References Cited

U.S. PATENT DOCUMENTS

| | | | |
|---|---|---|---|
| 7,000,863 | B2 | 2/2006 | Bethea et al. |
| 7,011,538 | B2 | 3/2006 | Chang |
| 7,016,590 | B2 | 3/2006 | Tanaka et al. |
| 7,017,721 | B1 | 3/2006 | Bradford |
| 7,027,704 | B2 | 4/2006 | Frohlich et al. |
| 7,036,601 | B2 * | 5/2006 | Berg .................... G02B 6/4457 166/385 |
| 7,044,278 | B2 | 5/2006 | Cleveland |
| 7,050,041 | B1 * | 5/2006 | Smith .................... G06F 3/0312 345/156 |
| 7,052,281 | B1 * | 5/2006 | Meyberg ................ H02G 11/02 439/4 |
| 7,065,282 | B2 * | 6/2006 | Sasaki .................... G02B 6/444 385/134 |
| 7,077,710 | B2 | 7/2006 | Haggay et al. |
| 7,081,808 | B2 | 7/2006 | Colombo et al. |
| 7,112,090 | B2 | 9/2006 | Caveney et al. |
| 7,120,349 | B2 | 10/2006 | Elliott |
| 7,123,810 | B2 | 10/2006 | Parrish |
| 7,139,461 | B2 | 11/2006 | Puetz et al. |
| 7,142,764 | B2 | 11/2006 | Allen et al. |
| 7,153,142 | B2 | 12/2006 | Shifris et al. |
| 7,165,728 | B2 | 1/2007 | Durrant et al. |
| 7,190,767 | B2 | 3/2007 | Kracker et al. |
| 7,193,422 | B2 | 3/2007 | Velleca et al. |
| 7,210,858 | B2 | 5/2007 | Sago et al. |
| 7,218,827 | B2 | 5/2007 | Vongseng et al. |
| 7,220,144 | B1 * | 5/2007 | Elliot .................... G02B 6/4441 439/535 |
| 7,226,217 | B1 | 6/2007 | Benton et al. |
| 7,234,944 | B2 | 6/2007 | Nordin et al. |
| 7,266,283 | B2 | 9/2007 | Kline et al. |
| 7,297,018 | B2 | 11/2007 | Caveney et al. |
| 7,306,101 | B2 * | 12/2007 | Murry .................... B65H 75/025 206/408 |
| 7,312,602 | B2 | 12/2007 | Hoopengarner |
| 7,312,715 | B2 | 12/2007 | Shalts et al. |
| D559,186 | S | 1/2008 | Kelmer |
| 7,315,224 | B2 | 1/2008 | Gurovich et al. |
| 7,315,681 | B2 | 1/2008 | Kewitsch |
| 7,346,253 | B2 | 3/2008 | Bloodworth et al. |
| 7,352,289 | B1 | 4/2008 | Harris |
| 7,364,108 | B2 | 4/2008 | Kim et al. |
| 7,369,739 | B2 | 5/2008 | Kline et al. |
| 7,370,106 | B2 | 5/2008 | Caveney |
| 7,397,997 | B2 | 7/2008 | Ferris |
| 7,399,198 | B2 | 7/2008 | Thalheimer et al. |
| 7,400,814 | B1 * | 7/2008 | Hendrickson ........ G02B 6/4441 385/134 |
| 7,406,242 | B1 | 7/2008 | Braga |
| 7,416,349 | B2 | 8/2008 | Kramer |
| 7,477,829 | B2 | 1/2009 | Kaplan |
| 7,479,032 | B2 | 1/2009 | Hoath et al. |
| 7,493,003 | B2 | 2/2009 | Kowalczyk et al. |
| 7,519,000 | B2 | 4/2009 | Caveney et al. |
| 7,522,806 | B2 | 4/2009 | Hendrickson et al. |
| 7,533,841 | B1 | 5/2009 | Harrison et al. |
| 7,543,137 | B2 | 5/2009 | Caveney et al. |
| 7,546,018 | B2 | 6/2009 | Hendrickson et al. |
| 7,548,679 | B2 | 6/2009 | Hirano et al. |
| 7,552,872 | B2 | 6/2009 | Tokita et al. |
| 7,570,861 | B2 | 8/2009 | Smrha et al. |
| 7,591,667 | B2 | 9/2009 | Gatnau Navarro et al. |
| 7,676,136 | B2 | 3/2010 | Wakileh et al. |
| 7,697,811 | B2 | 4/2010 | Murano et al. |
| 7,711,233 | B2 | 5/2010 | Mahoney |
| 7,715,679 | B2 | 5/2010 | Kowalczyk et al. |
| 7,751,672 | B2 | 7/2010 | Smith et al. |
| 7,756,379 | B2 | 7/2010 | Kowalczyk et al. |
| 7,809,234 | B2 | 10/2010 | Smith et al. |
| 7,811,119 | B2 | 10/2010 | Caveney et al. |
| 7,869,426 | B2 | 1/2011 | Hough et al. |
| 7,869,682 | B2 | 1/2011 | Kowalczyk et al. |
| 7,872,738 | B2 | 1/2011 | Abbott |
| 7,885,505 | B2 | 2/2011 | Zimmel |
| 7,894,701 | B2 | 2/2011 | Kowalczyk et al. |
| 8,081,857 | B2 | 12/2011 | Nair et al. |
| 8,131,126 | B2 | 3/2012 | Kowalczyk et al. |
| 8,157,582 | B2 | 4/2012 | Frey et al. |
| 8,189,984 | B2 | 5/2012 | Kowalczyk et al. |
| 8,229,267 | B2 | 7/2012 | Kowalczyk et al. |
| 8,254,740 | B2 | 8/2012 | Smith et al. |
| 8,265,447 | B2 | 9/2012 | Loeffelholz et al. |
| 8,326,107 | B2 | 12/2012 | Cooke et al. |
| 8,380,035 | B2 | 2/2013 | Kowalczyk et al. |
| 8,422,847 | B2 | 4/2013 | Kowalczyk et al. |
| 8,494,333 | B2 | 7/2013 | Kowalczyk et al. |
| 8,494,334 | B2 | 7/2013 | Kowalczyk et al. |
| 8,565,572 | B2 | 10/2013 | Krampotich et al. |
| 8,705,929 | B2 | 4/2014 | Kowalczyk et al. |
| 8,818,157 | B2 | 8/2014 | Burek et al. |
| RE45,153 | E * | 9/2014 | Hendrickson ........ G02B 6/4441 385/134 |
| 8,891,931 | B2 | 11/2014 | Kowalczyk et al. |
| 8,929,706 | B2 | 1/2015 | Teymouri |
| 8,938,147 | B2 | 1/2015 | Krampotich et al. |
| 9,170,392 | B2 | 10/2015 | Krampotich et al. |
| 9,223,103 | B2 | 12/2015 | Kachmar |
| 9,261,663 | B2 | 2/2016 | Loeffelholz et al. |
| 9,261,666 | B2 | 2/2016 | Kowalczyk |
| 9,310,578 | B2 | 4/2016 | Vastmans et al. |
| 9,341,892 | B2 | 5/2016 | Chang et al. |
| 9,429,728 | B2 | 8/2016 | Puetz et al. |
| 9,453,971 | B2 | 9/2016 | Anderson et al. |
| 9,555,227 | B2 | 1/2017 | Kowalczyk et al. |
| 9,606,319 | B2 | 3/2017 | Kowalczyk |
| 9,664,871 | B1 | 5/2017 | Galvan Mijangos et al. |
| 9,684,142 | B2 | 6/2017 | Collart et al. |
| 9,703,063 | B2 | 7/2017 | Van Baelen et al. |
| 9,766,414 | B2 | 9/2017 | Marcouiller et al. |
| 9,885,846 | B2 | 2/2018 | Kowalczyk et al. |
| 9,995,898 | B2 | 6/2018 | Krampotich et al. |
| RE47,307 | E | 3/2019 | Allen |
| 10,234,648 | B2 | 3/2019 | Kowalczyk et al. |
| 2001/0019002 | A1 | 9/2001 | Walters et al. |
| 2001/0048044 | A1 | 12/2001 | Sugata |
| 2002/0003186 | A1 | 1/2002 | Hinds |
| 2002/0023814 | A1 | 2/2002 | Poutiatine |
| 2002/0023984 | A1 * | 2/2002 | Oppmann ............... B65H 75/14 242/580 |
| 2002/0083538 | A1 * | 7/2002 | Silverman ............... B08B 9/045 15/104.33 |
| 2002/0117571 | A1 | 8/2002 | Scott et al. |
| 2002/0125800 | A1 | 9/2002 | Knudsen et al. |
| 2002/0126980 | A1 | 9/2002 | Holman et al. |
| 2002/0164121 | A1 | 11/2002 | Brennan et al. |
| 2002/0171002 | A1 | 11/2002 | Kretsch et al. |
| 2003/0037480 | A1 | 2/2003 | Davis |
| 2003/0042348 | A1 * | 3/2003 | Salentine ................ A45F 5/004 242/380 |
| 2003/0142817 | A1 * | 7/2003 | Liao ...................... H02J 7/0054 379/428.01 |
| 2003/0223724 | A1 | 12/2003 | Puetz et al. |
| 2003/0230662 | A1 | 12/2003 | Mims |
| 2003/0230667 | A1 * | 12/2003 | Ganster .................. B65D 85/04 242/613 |
| 2004/0013391 | A1 * | 1/2004 | Joseph, II ............ G02B 6/4457 385/135 |
| 2004/0052498 | A1 * | 3/2004 | Colombo ............... G02B 6/3807 385/147 |
| 2004/0065443 | A1 * | 4/2004 | Berg ...................... E21B 47/01 166/380 |
| 2004/0084271 | A1 * | 5/2004 | Woodruff .............. B65H 75/40 191/12.2 R |
| 2004/0129522 | A1 | 7/2004 | Skowronski |
| 2004/0170369 | A1 * | 9/2004 | Pons .................. G01M 11/3109 385/135 |
| 2004/0200332 | A1 * | 10/2004 | Chen ..................... B65H 49/205 83/648 |
| 2004/0209505 | A1 * | 10/2004 | Wade .................... B60R 16/027 439/164 |
| 2004/0240807 | A1 | 12/2004 | Frohlich et al. |

(56) References Cited

U.S. PATENT DOCUMENTS

| | | | |
|---|---|---|---|
| 2004/0244430 A1 | 12/2004 | Sheehy | |
| 2004/0258384 A1 | 12/2004 | Trebesch et al. | |
| 2005/0002633 A1* | 1/2005 | Solheid | G02B 6/3849 385/135 |
| 2005/0036587 A1 | 2/2005 | Kracker et al. | |
| 2005/0062881 A1* | 3/2005 | Caci | H05K 5/00 348/375 |
| 2005/0103515 A1 | 5/2005 | Fuller et al. | |
| 2005/0128769 A1* | 6/2005 | Gozum | F21L 14/02 362/581 |
| 2005/0145522 A1 | 7/2005 | Bloodworth et al. | |
| 2005/0184186 A1 | 8/2005 | Tsoi et al. | |
| 2005/0185910 A1* | 8/2005 | Zimmel | G02B 6/4453 385/135 |
| 2005/0213920 A1 | 9/2005 | Tanaka et al. | |
| 2005/0247136 A1 | 11/2005 | Cross et al. | |
| 2005/0258203 A1* | 11/2005 | Weaver | A45F 5/004 224/162 |
| 2005/0258411 A1 | 11/2005 | Zeitler | |
| 2005/0277829 A1* | 12/2005 | Tsonton | A61B 5/055 600/423 |
| 2006/0006038 A1 | 1/2006 | Beverlin | |
| 2006/0028198 A1* | 2/2006 | Hoopengarner | G01R 11/04 324/157 |
| 2006/0045458 A1* | 3/2006 | Sasaki | G02B 6/444 385/135 |
| 2006/0054760 A1* | 3/2006 | Murry | B65H 75/025 248/248 |
| 2006/0126883 A1 | 6/2006 | Thalheimer et al. | |
| 2006/0148279 A1 | 7/2006 | German et al. | |
| 2006/0153516 A1* | 7/2006 | Napiorkowski | G02B 6/445 385/135 |
| 2006/0160395 A1 | 7/2006 | Macauley et al. | |
| 2006/0163403 A1 | 7/2006 | Dickson | |
| 2006/0169856 A1* | 8/2006 | Dorenkamp | G02B 6/3825 248/231.9 |
| 2006/0183362 A1 | 8/2006 | Mullaney et al. | |
| 2006/0185695 A1 | 8/2006 | Kato | |
| 2006/0185953 A1* | 8/2006 | Gieseke | B65H 75/486 191/12.2 R |
| 2006/0186255 A1* | 8/2006 | Rooker | B65H 75/40 242/395 |
| 2006/0187696 A1* | 8/2006 | Lanni | H01R 31/065 363/146 |
| 2006/0210230 A1 | 9/2006 | Kline et al. | |
| 2006/0231672 A1* | 10/2006 | Eastwood | B65H 49/322 242/588.2 |
| 2006/0264094 A1* | 11/2006 | Young | H01R 25/006 439/501 |
| 2006/0266605 A1* | 11/2006 | Caamano | B65H 75/40 191/12 R |
| 2006/0280418 A1 | 12/2006 | Mahoney | |
| 2007/0022935 A1 | 2/2007 | Griffith et al. | |
| 2007/0023559 A1* | 2/2007 | Scapillato | B65H 75/28 242/400.1 |
| 2007/0025675 A1 | 2/2007 | Kramer | |
| 2007/0031101 A1 | 2/2007 | Kline et al. | |
| 2007/0036506 A1* | 2/2007 | Kewitsch | G02B 6/4457 385/135 |
| 2007/0096538 A1* | 5/2007 | Niemi | E21C 35/24 299/1.05 |
| 2007/0108333 A1* | 5/2007 | Kuramoto | B65H 75/406 242/395 |
| 2007/0165995 A1 | 7/2007 | Reagan et al. | |
| 2007/0176045 A1* | 8/2007 | Chen | B65H 75/14 242/614 |
| 2007/0189691 A1 | 8/2007 | Barth et al. | |
| 2007/0237470 A1 | 10/2007 | Aronson et al. | |
| 2008/0011514 A1* | 1/2008 | Zheng | G02B 6/4452 174/72 R |
| 2008/0011990 A1* | 1/2008 | Kostet | G02B 6/4457 254/134 |
| 2008/0013893 A1* | 1/2008 | Zheng | G02B 6/3851 385/78 |
| 2008/0013909 A1* | 1/2008 | Kostet | G02B 6/3851 385/135 |
| 2008/0035778 A1 | 2/2008 | Belden et al. | |
| 2008/0037945 A1 | 2/2008 | Gniadek et al. | |
| 2008/0093187 A1* | 4/2008 | Roberts | B65H 75/22 191/12.2 R |
| 2008/0100467 A1 | 5/2008 | Downie et al. | |
| 2008/0116312 A1* | 5/2008 | Eastwood | B65H 49/322 242/566 |
| 2008/0170831 A1* | 7/2008 | Hendrickson | G02B 6/4441 385/135 |
| 2008/0199139 A1* | 8/2008 | Henderson | H01R 13/72 385/135 |
| 2008/0218947 A1 | 9/2008 | Atkinson | |
| 2008/0236209 A1 | 10/2008 | Conti et al. | |
| 2008/0292261 A1 | 11/2008 | Kowalczyk et al. | |
| 2008/0315030 A1* | 12/2008 | Hendrickson | B65H 49/327 242/565 |
| 2009/0012666 A1 | 1/2009 | Simpson et al. | |
| 2009/0057085 A1* | 3/2009 | Caamano | B65H 75/40 191/12.4 |
| 2009/0060441 A1 | 3/2009 | Kowalczyk et al. | |
| 2009/0074370 A1 | 3/2009 | Kowalzyk et al. | |
| 2009/0097846 A1 | 4/2009 | Kozischek et al. | |
| 2009/0098763 A1 | 4/2009 | Below et al. | |
| 2009/0166404 A1 | 7/2009 | German et al. | |
| 2009/0190894 A1 | 7/2009 | Nhep et al. | |
| 2009/0215310 A1 | 8/2009 | Hoath et al. | |
| 2009/0257726 A1 | 10/2009 | Redmann et al. | |
| 2009/0317047 A1 | 12/2009 | Smith et al. | |
| 2010/0054680 A1 | 3/2010 | Lochkovic et al. | |
| 2010/0054682 A1 | 3/2010 | Cooke | |
| 2010/0054684 A1 | 3/2010 | Cooke et al. | |
| 2010/0074587 A1 | 3/2010 | Loeffelholz et al. | |
| 2010/0090830 A1 | 4/2010 | Conti et al. | |
| 2010/0166376 A1 | 7/2010 | Nair et al. | |
| 2010/0211664 A1 | 8/2010 | Raza et al. | |
| 2010/0211665 A1 | 8/2010 | Raza et al. | |
| 2010/0211697 A1 | 8/2010 | Raza et al. | |
| 2010/0215049 A1 | 8/2010 | Raza et al. | |
| 2010/0322583 A1 | 12/2010 | Cooke et al. | |
| 2011/0044599 A1 | 2/2011 | Kowalczyk et al. | |
| 2011/0092100 A1 | 4/2011 | Coffey et al. | |
| 2011/0094274 A1 | 4/2011 | Conti et al. | |
| 2011/0103761 A1 | 5/2011 | LeBlanc et al. | |
| 2011/0158598 A1 | 6/2011 | LeBlanc et al. | |
| 2011/0262077 A1 | 10/2011 | Anderson et al. | |
| 2011/0317974 A1 | 12/2011 | Krampotich et al. | |
| 2012/0251053 A1 | 10/2012 | Kowalczyk et al. | |
| 2013/0094828 A1 | 4/2013 | Loeffelholz et al. | |
| 2013/0170810 A1 | 7/2013 | Badar | |
| 2013/0170811 A1 | 7/2013 | Kowalczyk et al. | |
| 2013/0242866 A1 | 9/2013 | Lin et al. | |
| 2014/0010512 A1 | 1/2014 | Kowalczyk et al. | |
| 2014/0010513 A1 | 1/2014 | Kowalczyk et al. | |
| 2014/0219622 A1 | 8/2014 | Coan et al. | |
| 2015/0063770 A1 | 3/2015 | Kowalczyk et al. | |
| 2015/0093088 A1 | 4/2015 | Matz et al. | |
| 2017/0199344 A1 | 7/2017 | Kowalczyk et al. | |

FOREIGN PATENT DOCUMENTS

| | | |
|---|---|---|
| DE | 102 44 304 B3 | 3/2004 |
| EP | 1 107 031 A1 | 6/2001 |
| EP | 2 618 195 A2 | 7/2013 |
| FR | 2 566 997 A1 | 1/1986 |
| GB | 2 236 398 A | 4/1991 |
| JP | 1-123203 | 5/1989 |
| JP | 01123203 A * | 5/1989 |
| JP | 9-236709 | 9/1997 |
| JP | 11087006 A * | 3/1999 |
| JP | 11-349230 | 12/1999 |
| JP | 2003-114339 | 4/2003 |
| JP | 2005-73365 | 3/2005 |
| JP | 2005-249858 | 9/2005 |
| JP | 2007-121609 | 5/2007 |

(56) References Cited

FOREIGN PATENT DOCUMENTS

| JP | 2007121598 A | * | 5/2007 |
| JP | 2007121609 A | * | 5/2007 |
| WO | WO 2008/137894 A1 | | 11/2008 |
| WO | WO 2009/048680 A1 | | 4/2009 |
| WO | WO 2010/004100 A1 | | 1/2010 |
| WO | WO 2010/081186 A1 | | 7/2010 |
| WO | WO 2010/121639 A1 | | 10/2010 |

OTHER PUBLICATIONS

"V-Linx™ EZ-Spool Terminal", Furukawa Electric North America, Copyright © 2007.
7 Inch Modules, ADC Telecommunications, Inc, © 1998, "7 Inch Connector Module with IFC", pp. 127.
F3DF Modules, ADC Telecommunications, Inc. © 1995, "Individual 12-Pack Assemblies", pp. 90.
Fiber Cable Management Products, Third Edition, ADC Telecommunications, Inc., © 1995, 1998.
Fiber Distribution Frame, Pre-Terminated Rear Load Connector Module, Installation Instructions, ADC Telecommunications, Inc., © 2000.
Fiber Main Distribution Frame (FMDF), Fiber Terminal Block, Installation Instructions, ADC Telecommunications, Inc., © 2001.
Fiber Panel Products—Cable Management Tray Panels, ADC Telecommunications, Inc., © 1994, 1996 "72 Fiber Distribution Module (FDM) with Intrafacility Fiber Cable", pp. 56.
Fiber Panel Products, Second Edition, ADC Telecommunications, Inc., © 1994, 1996.
FL2000 Products—Preconfigured Panels, ADC Telecommunications, Inc., © 2000 "Rack or Cabinet Mount Termination Panel with Multifiber Cable", pp. 13.
FL2000 Products, ADC Telecommunications, Inc., © 1994, 1996.
FL2000 Products, ADC Telecommunications, Inc., © 1994, 1996, "Rack Mount Panel with Intrafacility Fiber Cable", pp. 16.
IFC Style Frame Modules, ADC Telecommunications, Inc., © 1995, "Connector Module Equipped with IFC", pp. 27.
Next Generation Frame (NGF), Product Family Ordering Guide, ADC Telecommunications, Inc., © 1996, 1999, 2000, "Fiber Termination Blocks (FTB) Preterminated", pp. 8.
Next Generation Frame (NGF), Product Family Ordering Guide, ADC Telecommunications, Inc., © 1996, 1999, 2000.
Next Generation Frames—Fiber Termination Blocks, ADC Telecommunication, Inc., © 1998, "Fiber Termination Blocks (FTB) Preterminated" pp. 6.
Value-Added Module System, ADC Telecommunications, Inc., © 1993, 1194, 1998, "12-Pack Module Assemblies", pp. 30-31.
Plaintiff's Notice of Dismissal relating to Civil Action No. 5:11-cv-02509-JS, *ADC Telecommunications, Inc.* v. *Opterna Am, Inc.* filed Jul. 12, 2011 (1 page).
Complaint relating to Civil Action No. 1:11-cv-735 (GBL-IDD), *ADC Telecommunications, Inc.* v. *Opterna AM, Inc.* filed Jul. 12, 2011 (6 pages).
Complaint relating to Civil Action No. 5:11-cv-02509-JS, *ADC Telecommunications, Inc.* v. *Opterna AM, Inc.* filed Apr. 11, 2011 (14 pages).
Description of Admitted Prior Art, 30 pages, dated Oct. 27, 2009.
European Search Report for Application No. 13163032.9 dated Jul. 4, 2013.
Office Action dated Nov. 8, 2013 from Australian Patent Office for corresponding Australian Pat. Appln. No. 2008247361.
English machine translation of JP H11-349230, which was previously submitted with an English Abstract and which is cited in the Australian Office Action.
Complaint; *CommScope Technologies LLC*v. *Clearfield, Inc.*, Case No, 0:17-cv-00307, 77 pages (Jan. 31, 2017).
Complaint Exhibit G, *CommScope Technologies LLC*v. *Clearfield, Inc.*, Case No. 0:17-cv-00307-PJS-BRT, 3 pages (Jan. 31, 2017).
Complaint Exhibit H, *CommScope Technologies LLC*v. *Clearfield, Inc.*, Case No, 0:17-cv-00307-PJS-BRT, 3 pages (Jan. 31, 2017).

Answer, *CommScope Technologies LLC*v. *Clearfield, Inc.*, Case No. 0:17-cv-00307-PJS-BRT, 27 pages (Apr. 24, 2017).
Defendant Clearfield Inc.'s Preliminary Invalidity Claim Charts and Disclosures, *CommScope Technologies*v. *Clearfield, Inc.* , Case No. 0:1.7-cv-00307-PJS-BRT, 62 pages (Oct. 6, 2017).
Defendant Clearfield Inc.'s Invalidity Claim Chart Exhibit 10, *CommScope Technologies LLC*v. *Clearfield, Inc.*, Case No, 0:17-cv-00307-PJS-BRT, 36 pages (Oct. 6, 2017).
Defendant Clearfield Inc.'s Invalidity Claim Chart Exhibit 11, *CommScope Technologies LLC*v. *Clearfield, Inc.*, Case No. 0:17-cv-00307-PJS-BRT, 60 pages (Oct. 6, 2017).
Defendant Clearfield Inc.'s Invalidity Claim Chart Table D, *CommScope Technologies LLC*v. *Clearfield, Inc.*, Case No. 0:17-cv-00307-PJS-BRT, 7 pages (Oct. 6, 2017).
Defendant Clearfield Inc.'s Invalidity Claim Chart Table E, *CommScope Technologies LLC*v. *Clearfield, Inc.*, Case No. 0:17-cv-00307-PJS-BRT, 7 pages (Oct. 6, 2017).
Plaintiff CommScope's Initial Claim Charts including Exhibits J and K. *CommScope Technologies LLC*v. *Clearfield, Inc.*, Case No. 0:17-cv-00307-PJS-BRT, 38 pages (Oct. 9, 2017).
Plaintiff CommScope Technologies LLC's Response to Defendant's First Set of Interrogatories to Plaintiff (Nos. 1-15), *CommScope Technologies LLC*v. *Clearfield, Inc.*, Case No. 0:17-cv-00307-PJS-BRT, 26 pages (Oct. 9, 2017).
Plaintiff CommScope Technologies LLC's Supplemental Response to Defendant's Interrogatory No. 2. *CommScope Technologies LLC*v. *Clearfield, Inc.*, Case No. 0:17-cv-00307-PJS-BRT, 5 pages (Oct. 9, 2017).
Plaintiff CommScope Technologies LLC's Memorandum in Support of Motion to Compel Discovery, *CommScope Technologies LLC*v. *Clearfield, Inc.*, Case No. 0:17-cv-00307-PJS-BRT, 21 pages (Oct. 9, 2017).
Petition for *Inter Partes* Review of U.S. Pat. No. 8,705,929, *Clearfield Inc.*v. *CommScope Technologies LLC*, Case No. IPR2017-02122, 67 pages (Sep. 15, 2017).
*Inter Partes* Review Case No. IPR2017-02122, Ex. 1003—Declaration of Dr. Michael Lebby, 141 pages (Sep. 15, 2017).
*Inter Partes* Review Case No, 1PR2017-02122, Ex. 1004—U.S. Pat. No. 6,220,413 B1.
*Inter Partes* Review Case No. IPR2017-02122, Ex. 1005—U.S. Pat. No. 6,933,441 B2.
*Inter Partes* Review Case No. IPR2017-02122, Ex. 1006—U.S. Pat. No. 4,201,278.
*Inter Partes* Review Case No. IPR2017-02122, Ex. 1007—Prosecution History of U.S. Appl. No. 12/182,705, filed Jul. 30, 2008, 332 pages.
*Inter Partes* Review Case No. 1PR2017-02122, Ex. 1008—PCT Patent No. WO 2009/048680 A1.
*Inter Partes* Review Case No. IPR2017-02122, Ex. 1009—European Patent No. 2 618 195 A2.
*Inter Partes* Review Case No. IPR2017-02122, Ex. 1010—File Wrapper of EP App. No. 131630319, downloaded that European Patent Office on Aug. 10, 2017, 222 pages.
*Inter Partes* Review Case No. IPR2017-02122, Ex. 1011—U.S. Pat. No. 4,657,140.
*Inter Partes* Review Case No. IPR2017-02122, Ex. 1012—USConec MTP® Brand Connectors Data Sheet (© 2014), 2 pages.
*Inter Partes* Review Case No. IPR2017-02122, Ex. 1013—Katsuki Sueinatsu et al., "Super Low-Loss, Super High-Density Multi-Fiber Optical Connectors," Furukawa Review (n. 23), 2003 ("*Suematsu*").
*Inter Partes* Review Case No. IPR2017--02122, Ex. 1014—U.S. Pat. No. 6,885,799 B2.
*AVMM's Enhanced SYSTIMAX® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.
*Intelligent patching systems carving out a 'large' niche*, Cabling Installation & Maintenance: vol. 12, Issue 7, Jul. 2004 (5 pages).
*intelliMAC: The intelligent way in make Moves, Adds or Changes!* NORDX/CDT (6 pages).
International Search Report and Written Opinion for PCT/US2010/052872 dated Jan. 12, 2011.

(56) References Cited

OTHER PUBLICATIONS

International Search Report and Written Opinion for PCT/US2011/041605 dated Feb. 24, 2012.
Meredith, L., "Managers missing point of intelligent patching," *Daa Center News*, Jun. 21, 2005, obtained Dec. 2, 2008 from http://searchdatacenter.techtarget.com/news/article/0,289142,sid80_gci1099991,00.html.
Ohtsuki, F. et al., "Design of Optical Connectors with ID Modules," *Electronics and Communications in Japan*, Part 1, vol. 77, No. 2, pp. 94-105 (Feb. 1994).
*SYSTIMAX® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.
TrueNet; TFP Series Rack Mount Fiber Panels, Spec Sheet: May 2008; 8 pages.
Response by Patent Owner Under 37 C.F.R. § 42.107, Paper No. 6, Case No. IPR2017-02122, 71 pages (Dec. 22, 2017)).
Defendant Clearfield Inc.'s Second Revised Preliminary Invalidity Claim Charts and Disclosures, Civil Action No. 17-cv-00307-PJS-BRT, 65 pages (Jan. 12, 2018).
Exhibit 10 to Second Revised Preliminary Invalidity Claim Charts and Disclosures, Civil Action No. 17-cv-00307PJS-BRT, 43 pages (Jan. 12, 2018).
Exhibit 11 to Second Revised Preliminary Invalidity Claim Charts and Disclosures, Civil Action No. 17-cv- (Jan. 12, 2018) Commscope's Response to Clearfield's Second Revised Invalidity Claim Charts and Disclosure, Civil Action No. 17-cv-00307-PJS-BRT, 105 pages (Jan. 19, 2018).
Commscope's Response to Clearfield's Second Revised Preliminary Invalidity Claim Charts and Disclosures, Civil Action No. 17-cv-00307-PJS-BRT, 105 pages (Jan. 19, 2018).
Exhibit J to Second Revised Preliminary Invalidity Claim Charts and Disclosures, Civil Action No. 17-cv-00307-PJS-BRT, 21 pages (Jan. 19, 2018).
Exhibit K to Second Revised Preliminary Invailidity Claim Charts and Disclosures, Civil Action No. 17-cv-00307-PJS-BRT, 19 pages (Jan. 19, 2018).
Defendant Clearfield Inc.'s Revised Preliminary Invalidity Claim Charts and Disclosures, Civil Action No. 17-cv-00307-PJS-BRT, 51 pages (Dec. 11, 2017).
Defendant Clearfield Inc.'s Revised Invalidity Claim Chart Exhibit 10, *CommScope Technologies LLCv. Clearfield, Inc.*, Case No. 0:17-cv-00307-PJS-BRT, 38 pages (Dec. 11, 2017).
Defendant Clearfield Inc.'s Revised Invalidity Claim Chart Exhibit 11, *CommScope Technologies LLCv. Clearfield, Inc.*, Case No. 0:17-cv-00307-PJS-BRT, 39 pages (Dec. 11, 2017).
Defendant Clearfield Inc.'s Revised Invalidity Claim Chart Table D, *CommScope Technologies LLCv. Clearfield, Inc.*, Case No. 0:17-cv-00307-PJS-BRT, 7 pages (Dec. 11, 2017).
Defendant Clearfield Inc.'s Revised Invalidity Claim Chart Table E, *CommScope Technologies LLCv. Clearfield, Inc.*, Case No. 0:17-cv-00307-PJS-BRT, 6 pages (Dec. 11, 2017).
Joint Status Report, *CommScope Technologies LLCv. Clearfield, Inc.*, Case No. 0:17-cv-00307-PJS-BRT, 11 pages (Feb. 9, 2018.
Joint Status Report Exhibit A, *CommScope Technologies LLCv. Clearfield, Inc.*, Case No. 0:17-cv-00307-PJS-BRT, 33 pages (Feb. 9, 2018).
Joint Status Report Exhibit B, *CommScope Technologies LLCv. Clearfield, Inc.*, Case No. 0:17-cv-00307-PJS-BRT, 21 pages (Feb. 9, 2018).
Stipulation of Dismissal, *CommScope Technologies LLCv. Clearfield, Inc.*, Case No. 0:17-cv-00307-PJS-BRT, 2 pages (Feb. 19, 2018).
Order of Dismissal, *CommScope Technologies LLCv. Clearfield, Inc.*, Case No. 0:17-cv-00307-PJS-BRT, 1 page (Feb. 20, 2018).
Australian Examination Report for Application No. 2015205930; dated Jul. 13, 2016; 4 pages.
Australian Office Action (Appln. No. 2008247361), dated Nov. 8, 2013.
European Search Report for Application No. 15182271.5 dated Dec. 2, 2015.
International Search Report and Written Opinion for PCT/US2008/062764 dated Aug. 8, 2008.
International Search Report and Written Opinion for PCT/US2008/075196 dated Nov. 18, 2008.
International Search Report and Written Opinion for PCT/US2008/072218 dated Mar. 18, 2009.
Ex. 2001—Declaration of Casimer DeCusatis in Support of Patent Owner's Preliminary Response, Case IPR2017-02122.
Ex. 2002—Office Action dated Jun. 19, 2009 in connection with U.S. Appl. No. 12/182,705.
Ex. 2003—Response to Jun. 19, 2009 Office Action in connection with U.S. Appl. No. 12/182,705.
Ex. 2004—U.S. Patent Application Publication No. 2006/021 0230 ("Kline").
Ex. 2005—Excerpts from the Merriam-Webster's Collegiate Dictionary (Tenth Edition) (2000).
Ex. 2006—Excerpts from the New Oxford American Dictionary (Third Edition) (2010).

\* cited by examiner

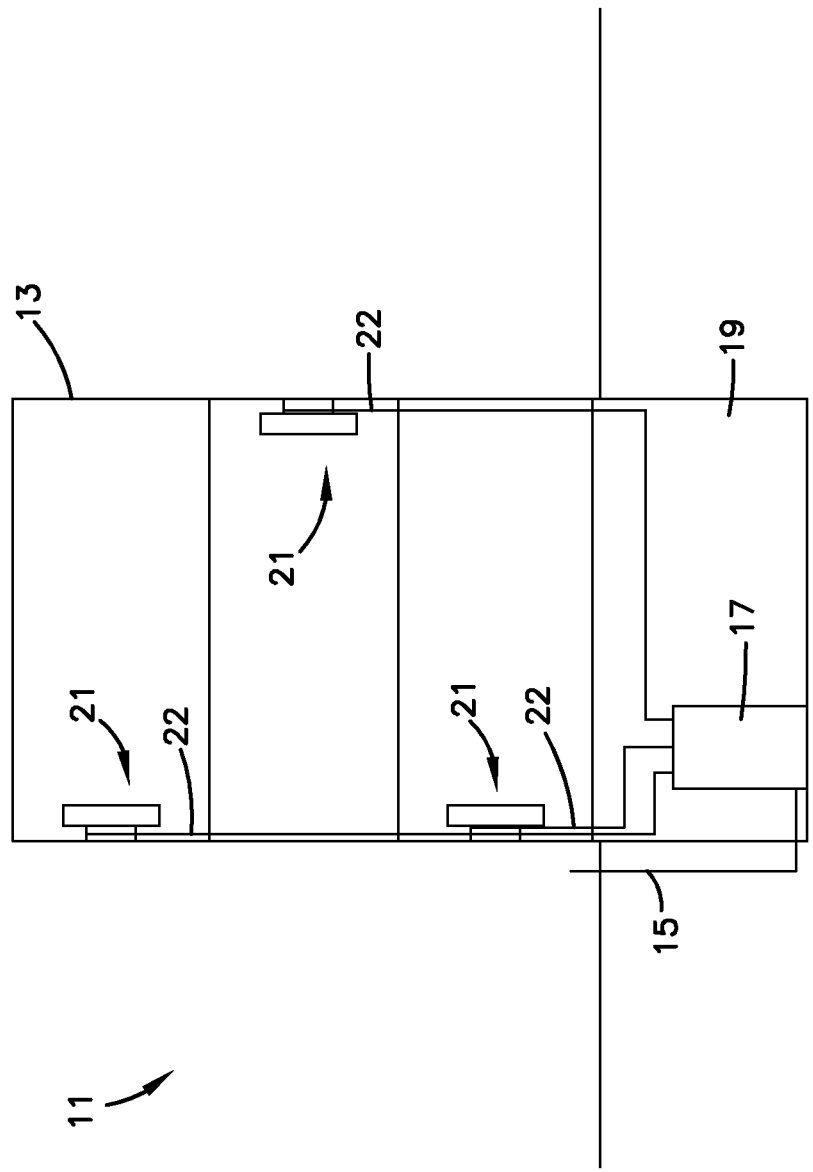

FIBER OPTIC ASSEMBLY WITH CABLE STORAGE ARRANGEMENT

CROSS-REFERENCE TO RELATED APPLICATIONS

This application is a continuation of application Ser. No. 14/703,446, filed May 4, 2015, now U.S. Pat. No. 9,535,227, which is a continuation of application Ser. No. 13/743,967, filed Jan. 17, 2013, now U.S. Pat. No. 9,057,860, which is a continuation of application Ser. No. 13/348,133, filed Jan. 11, 2012, now U.S. Pat. No. 8,380,035, which is a continuation of application Ser. No. 12/715,855, filed Mar. 2, 2010, now U.S. Pat. No. 8,131,126, which is a continuation of application Ser. No. 12/113,786, filed May 1, 2008, now U.S. Pat. No. 7,715,679, which claims the benefit of provisional application Ser. Nos. 60/916,495, filed May 7, 2007; 60/954,210, filed Aug. 6, 2007; and 61/037,223, filed Mar. 17, 2008, which applications are incorporated herein by reference in their entirety.

TECHNICAL FIELD

The present disclosure relates to fiber optic enclosure, and more particularly, to a fiber optic enclosure with cable payout.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

SUMMARY

An aspect of the present disclosure relates to a fiber optic enclosure assembly. The fiber optic enclosure includes an enclosure that is adapted to optically connect incoming fibers to outgoing fibers. A cable spool is connected to an exterior of the enclosure. A cable having the incoming fibers is disposed about the cable spool.

Another aspect of the present disclosure relates to a fiber optic enclosure for enclosing optical fiber connections. The fiber optic enclosure includes an enclosure, a cable spool assembly disposed on an exterior surface of the enclosure, and a mounting assembly. The mounting assembly is rotationally engaged with the cable spool assembly such that the cable spool assembly selectively rotates about an axis of the mounting assembly. The mounting assembly includes a bearing assembly and is adapted for engagement with a mounting location.

Another aspect of the present disclosure relates to a fiber optic enclosure for enclosing optical fiber connections. The fiber optic enclosure includes an enclosure and a cable spool assembly disposed on an exterior surface of the enclosure. The cable spool assembly includes a drum portion, a cable disposed about the drum portion, and a cable strain relief member. The cable strain relief member is engaged to the drum portion and a portion of the cable.

Another aspect of the present disclosure relates to a method of paying out a cable from a fiber optic enclosure. The method includes providing a fiber optic enclosure having an enclosure and a cable spool exteriorly disposed on the enclosure. The enclosure is adapted to optically connect incoming fibers of a first cable, which is disposed around the cable spool, and outgoing fibers of a second cable. The enclosure and the cable spool are rotated about an axis until a desired length of the first cable is paid out.

Another aspect of the present disclosure relates to a method of paying out a cable from a fiber optic enclosure. The method includes mounting a mounting plate to a mounting location. The mounting plate is rotationally engaged with a cable spool, which includes a cable disposed about the cable spool, such that the cable spool selectively rotates about an axis of the mounting plate. The cable spool is rotated about the axis of the mounting plate until a desired length of cable is paid out. The method further includes mounting an enclosure to a first axial end of the cable spool.

Another aspect of the present disclosure relates to a fiber optic telecommunications device. The fiber optic telecommunications device includes an enclosure defining an interior. A first fiber optic adapter is provided at the enclosure. A spool is provided at an exterior of the enclosure. A fiber optic cable, which includes a first optical fiber, is wrapped around the spool. A first fiber optic connector is mounted at a first end of the first optical fiber. The first end of the first optical fiber is positioned within the interior of the enclosure. The first fiber optic connector is inserted within the first fiber optic adapter. The enclosure and the spool are configured to rotate in unison about a common axis when the fiber optic cable is unwound from the spool.

Another aspect of the present disclosure relates to a method for installing telecommunications equipment. The method includes providing telecommunications equipment having an enclosure, a spool, and an optical cable, which includes a first optical fiber having a first end and a second end, wrapped around the spool. The method includes rotating the enclosure and the spool in unison about a common axis to pay out the optical cable from the spool so that the second end of the first optical fiber can be positioned at a remote location that is remote from the enclosure and the spool. The method further includes using the enclosure as an interconnect location for optically coupling the first optical fiber of the optical cable to a second optical fiber routed away from the enclosure.

Another aspect of the present disclosure relates to a method for installing telecommunications equipment. The method includes providing telecommunications equipment having an enclosure and a spool. The telecommunications equipment further includes an optical cable wrapped around the spool. The optical cable has a first length wrapped around the spool. The first length includes an installation length and an excess length. The optical cable includes a first end and a second end. The method further includes positioning the spool and the enclosure at a first location. The second end of the optical cable is moved to a second location by paying off the installation length of the optical cable from the spool while the spool, the first end of the optical cable and the enclosure remain at the first location. The excess length of optical cable is stored on the spool at the first location. The enclosure and the spool with the excess length of optical cable wrapped thereon remain at the first location after the installation process has been completed.

Another aspect of the present disclosure relates to a fiber optic telecommunications device having a first fiber optic adapter, a spool, and a fiber optic cable wrapped around the spool. The fiber optic cable includes a first optical fiber. A first fiber optic connector is mounted at a first end of the first optical fiber. The first end of the first fiber optic connector is inserted within the first fiber optic adapter. The first fiber optic adapter and the spool is configured to rotate in unison about a common axis when the fiber optic cable is unwound from the spool.

Another aspect of the present disclosure relates to a method of installing telecommunications equipment. The method includes providing telecommunications equipment having a fiber optic adapter and a spool. The telecommunications equipment further includes an optical cable wrapped around the spool. The optical cable includes a first optical fiber having a first end and a second end. The first end of the first optical fiber is connectorized. The method further includes rotating the fiber optic adapter and the spool in unison about a common axis to pay out the optical cable from the spool so that the second end of the first optical fiber can be positioned at a remote location that is remote from the fiber optic adapter and the spool.

Another aspect of the present disclosure relates to a fiber optic enclosure. The fiber optic enclosure includes a means for enclosing optical connections between incoming fibers of a first cable and outgoing fibers of a second cable. The fiber optic enclosure further includes means for storing excess length of the first cable on an exterior of the fiber optic enclosure.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 1 is a schematic representation of a fiber optic network that includes a fiber optic enclosure having features that are examples of inventive aspects in accordance with the principles of the present disclosure.

DETAILED DESCRIPTION

Figure 1A:
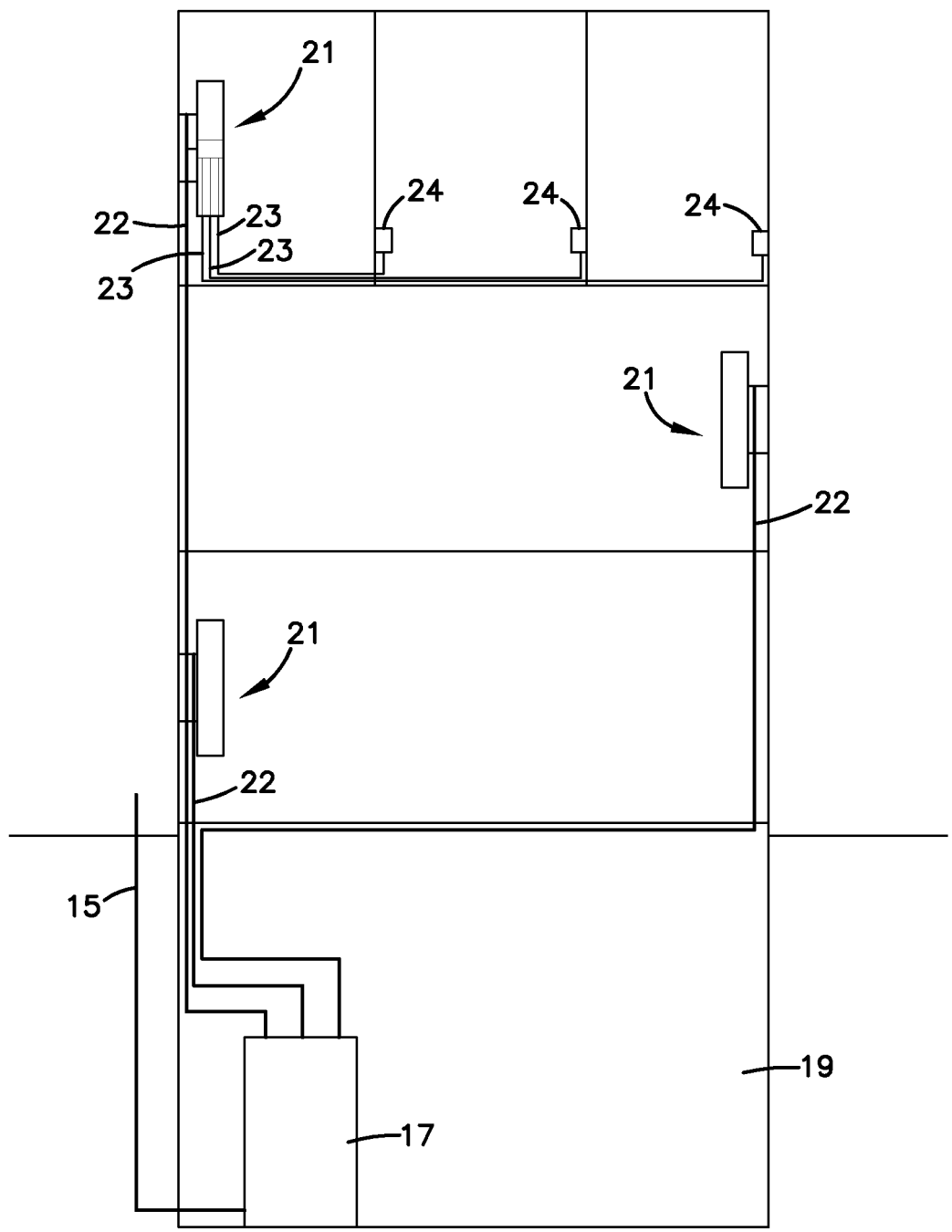
FIG. 1A is a schematic representation of the fiber optic network showing a second cable extending from the fiber optic enclosure.

Reference will now be made in detail to the exemplary aspects of the present disclosure that are illustrated in the accompanying drawings. Wherever possible, the same reference numbers will be used throughout the drawings to refer to the same or like structure.

Referring now to FIG. 1, a schematic representation of a fiber optic network, generally designated 11, in a facility 13 (e.g. individual residence, apartment, condominium, business, etc.) is shown. The fiber optic network 11 includes a feeder cable 15 from a central office (not shown). The feeder cable 15 enters a feeder cable input location 17 (e.g., a fiber distribution hub, a network interface device, etc.) having one or more optical splitters (e.g., 1-to-8 splitters, 1-to-16 splitters, or 1-to-32 splitters) that generate a number of individual fibers. In the present disclosure, the feeder cable input location 17 will be referred to as a fiber distribution hub 17. It will be understood, however, that the feeder cable input location 17 is not limited to being a fiber distribution hub 17. In the subject embodiment, and by way of example only, the fiber distribution hub 17 is located on a lower level 19 of the facility 13. Each unit in the facility 13 includes a fiber optic enclosure, generally designated 21, mounted to a structure or mounting location (e.g., a wall, etc.). Each of the fiber optic enclosures 21 includes a first cable 22 (e.g., a subscriber cable) extending from the fiber optic enclosure 21 to the fiber distribution hub 17. The subscriber cable 22 extending between the fiber distribution hub 17 and the fiber optic enclosure 21 typically includes multiple optical fibers.

Referring now to FIG. 1A, each of the fiber optic enclosures 21 includes optical connections between an end of the first cable 22 and an end of a second cable 23. The second cable 23 extends from the fiber optic enclosure 21 to an end location 24. In the depicted embodiment, the end locations 24 are disposed in rooms of a unit of the facility 13.

Figure 2:
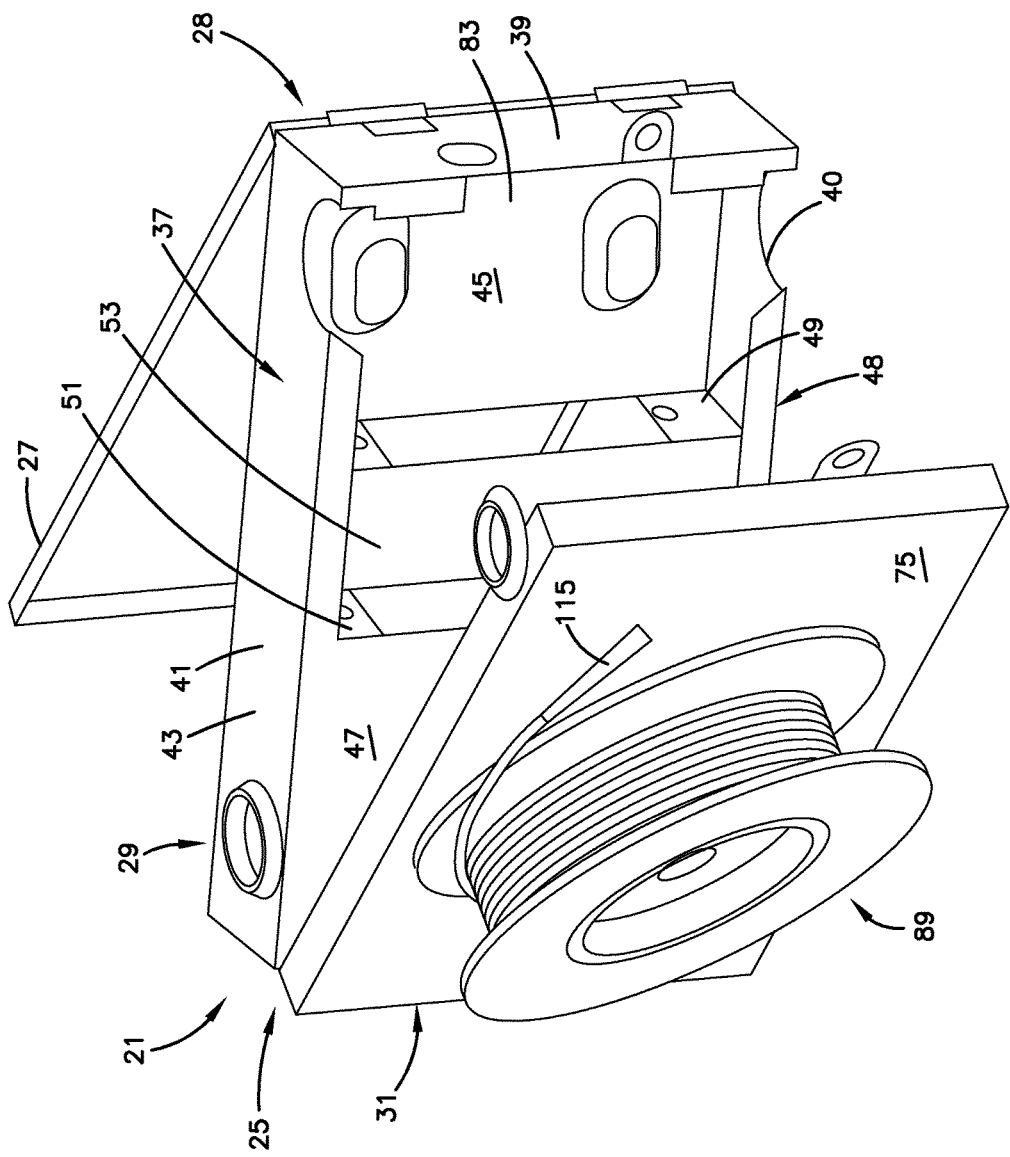
FIG. 2 is a perspective view of the fiber optic enclosure of FIG. 1.
Figure 2A:
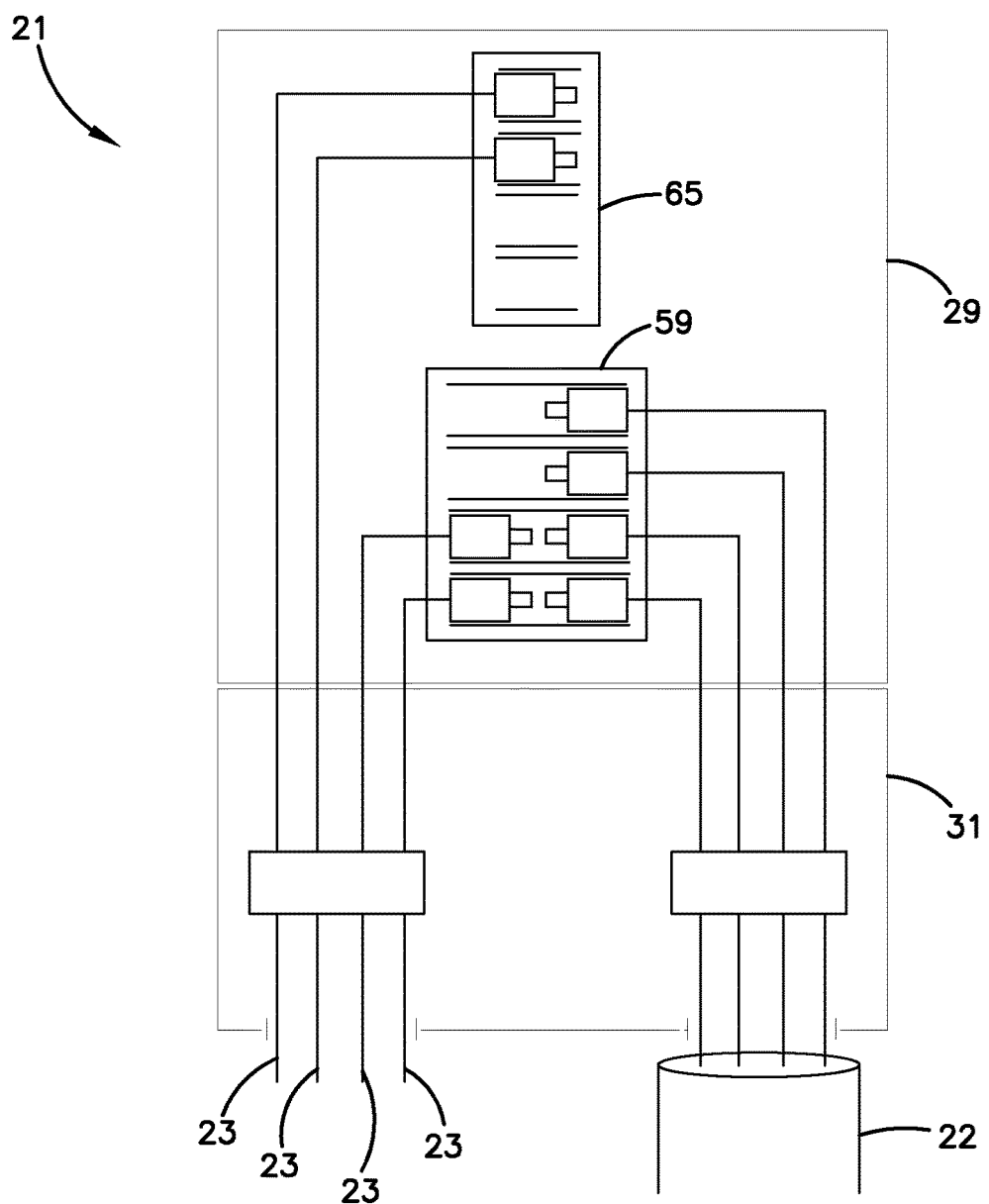
FIG. 2A is a cable routing schematic suitable for use within the fiber optic enclosure of FIG. 2.

Referring now to FIGS. 2 and 2A, the fiber optic enclosure 21 will be described. The fiber optic enclosure 21 includes a housing, generally designated 25 having a cover 27, which is pivotally engaged with the housing 25. The housing 25 and the cover 27 from an enclosure 28. In the subject embodiment, the housing 25 includes a termination module, generally designated 29, and a base, generally designated 31.

The termination module 29 of the fiber optic enclosure 21 serves as the dividing line between incoming fibers of a first cable (e.g., the subscriber cable 22) and outgoing fibers of the second cable 23. As the termination module 29 has been described in detail in U.S. patent application Ser. No. 11/762,427, entitled "Modular Optical Wall Box Enclosure", filed on Jun. 13, 2007 and hereby incorporated by reference in its entirety, the termination module 29 will only be briefly described herein. The termination module 29 includes a frame, generally designated 37, that includes a plurality of sidewalls 39. In the subject embodiment, two of the sidewalls 39 include cable ports 40 which allow fiber optic cables to be routed out of the housing 25 to a desired end location. The frame 37 has a front portion 41 and a back portion 43. The termination module 29 further includes a front panel 45, a rear panel 47, and a stepped panel portion, generally designated 48. In the subject embodiment, the front panel 45 is generally parallel to the rear panel 47 and is located adjacent the front portion 41 of the frame 37. The stepped panel portion 48 extends from the front panel 45 to the rear panel 47 and includes first and second intermediate panels 49, 51 that are separated by a step 53. In the subject embodiment, the first and second intermediate panels 49, 51 angularly extend between the front panel 45 and the rear panel 47.

Figure 3:
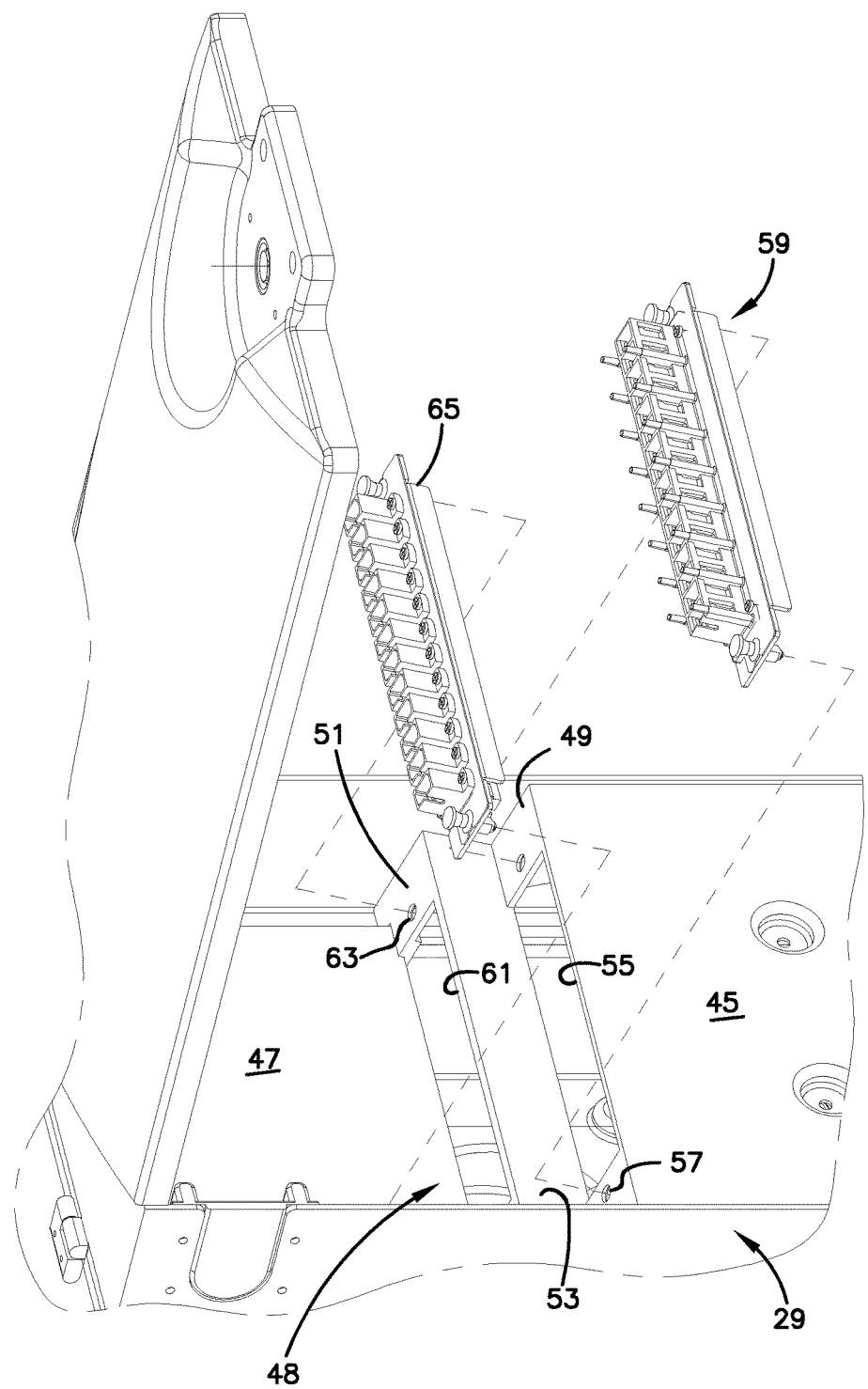
FIG. 3 is an enlarged, fragmentary view of a termination module of the fiber optic enclosure of FIG. 2.

Referring now to FIGS. 2A and 3, the first intermediate panel 49 defines a termination bank opening 55 and a plurality of termination bank fastener openings 57, which are disposed adjacent to the termination bank opening 55. A termination bank, generally designated 59, is inserted through the termination bank opening 55 and mounted to the first intermediate panel 49 using the termination bank fastener openings 57. The second intermediate panel 51 defines a storage bank opening 61 and a plurality of storage bank fastener openings 63, which are disposed adjacent to the storage bank opening 61. A storage bank 65 is inserted through the storage bank opening 61 and mounted to the second intermediate panel 51 using the storage bank fastener openings 63. An exemplary storage bank 65 that is suitable for use with the fiber optic enclosure 21 has been described in U.S. Pat. No. 7,218,827, which is hereby incorporated by reference in its entirety.

Figure 4:
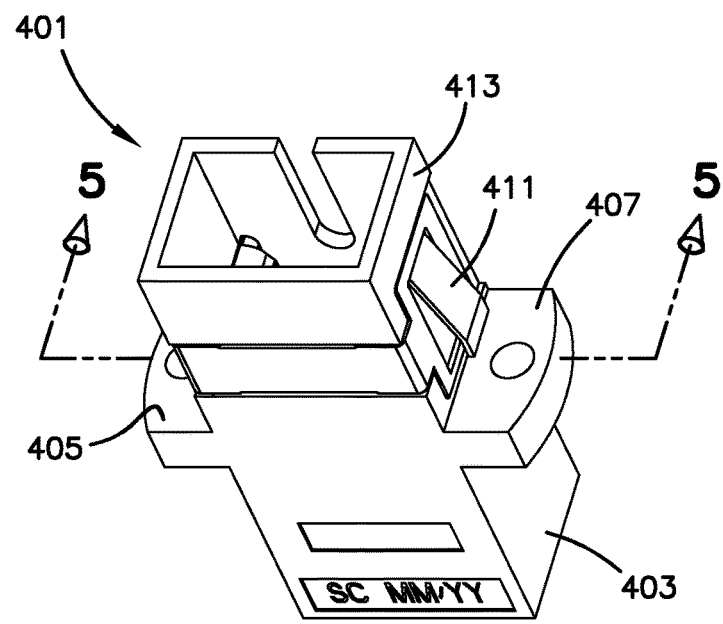
FIG. 4 is a perspective view of a fiber optic adapter suitable for use within the termination module of FIG. 3.
Figure 5:
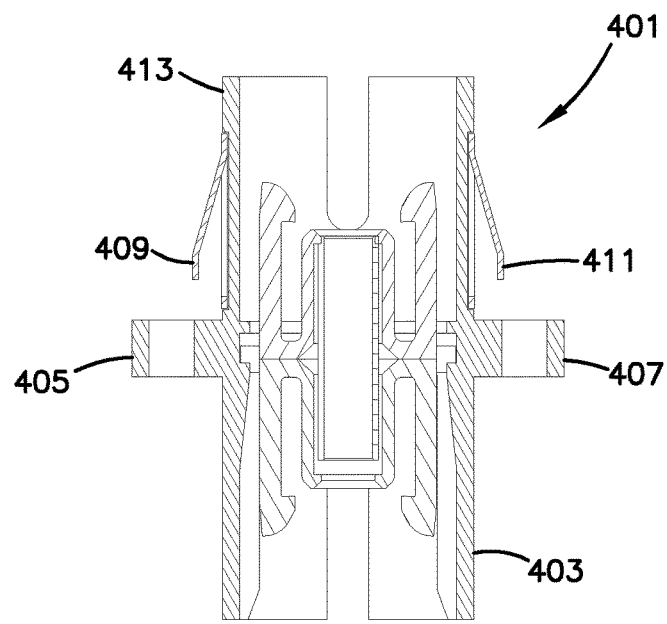
FIG. 5 is a cross-sectional view of the fiber optic adapter taken on line 5-5 of FIG. 4.

Referring now to FIGS. 4 and 5, the termination bank 59 is adapted to receive a plurality of adapters, generally designated 401. The adapters 401 are SC-type adapters 401, although it will be understood that the scope of the present disclosure is not limited to SC-type adapters 401. As the SC-type adapter 401 was described in U.S. Pat. No. 5,317,663, which is hereby incorporated by reference in its entirety, the SC-type adapter will only be briefly described herein. The SC-type adapter includes a main body 403 with a pair of tabs 405, 407 located on the exterior of the main body 403. The tabs 405, 407 serve to support the adapter 401 in the termination bank 59. The adapter 401 further includes a pair of retaining clips 409, 411, with one retaining clip 409, 411 associated with each tab 405, 407. A front side 413 of the adapter 401 is inserted into the termination bank 59. As the adapter 401 is inserted through the termination bank 59, the retaining clips 409, 411 compress against the main body 403. The adapter is inserted into the termination bank 59 until the tabs 405, 407 abut the termination bank 59. With the tabs 405, 407 abutting the termination bank 59, the retaining clips 409, 411 decompress on the opposite side of the termination bank 59, thereby retaining the termination bank 59 between the retaining clips 409, 411 and the tabs 405, 407.

Figure 6:
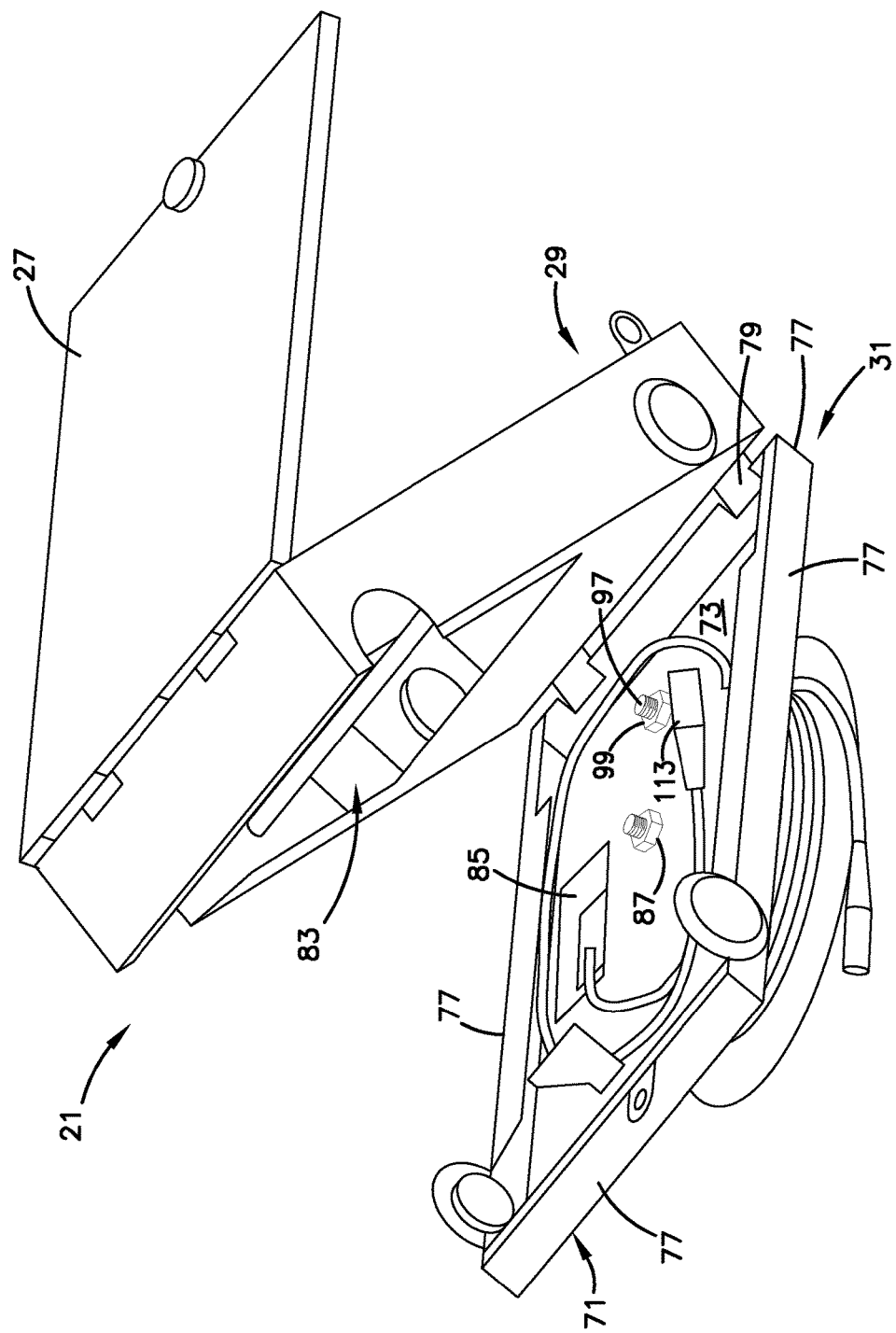
FIG. 6 is a perspective view of the fiber optic enclosure of FIG. 2.

Referring now to FIGS. 2 and 6, the base 31 will be described. In the subject embodiment, the base 31 includes a panel, generally designated 71, having a front side 73 and a back side 75. The panel 71 of the base 31 further includes a plurality of sides 77. In the subject embodiment, the base 31 is pivotally engaged to the back portion 43 of one of the sidewalls 39 of the termination module 29. In the subject embodiment, the pivotal engagement is accomplished by a hinge 79 disposed on the back portion 43 of one of the sidewalls 39 of the termination module 29 and one of the sides 77 of the base 31. The pivotal engagement between the termination module 29 and the base 31 allows the interface between the termination module 29 and the base 31 to be selectively opened and closed. In the open position (shown in FIGS. 2 and 6), the termination module 29 can be pivoted away from the front side 73 of the panel 71 to provide access to the back portion 43 of the termination module 29. In the closed position (shown schematically in FIG. 7), the front side 73 of the panel 71 and the interior surfaces of the sidewalls 39 of the frame 37 define an interior region 83 of the housing 25. In addition, the back side 75 of the base 31 and the outer surfaces of the sidewalls 39 of the frame 37 define the exterior surfaces of the housing 25.

The panel 71 of the base 31 defines a cable passage 85 that extends through the back side 75 and front side 73. In a preferred embodiment, the cable passage 85 is chamfered with the opening of the cable passage 85 at the front side 73 of the base 31 being larger than the opening of the cable passage 85 at the back side 75. The chamfer provides bend radius protection for cable passing through the cable passage 85 by eliminating perpendicular corners. The panel 71 further defines a plurality of mounting holes 87.

Figure 7:
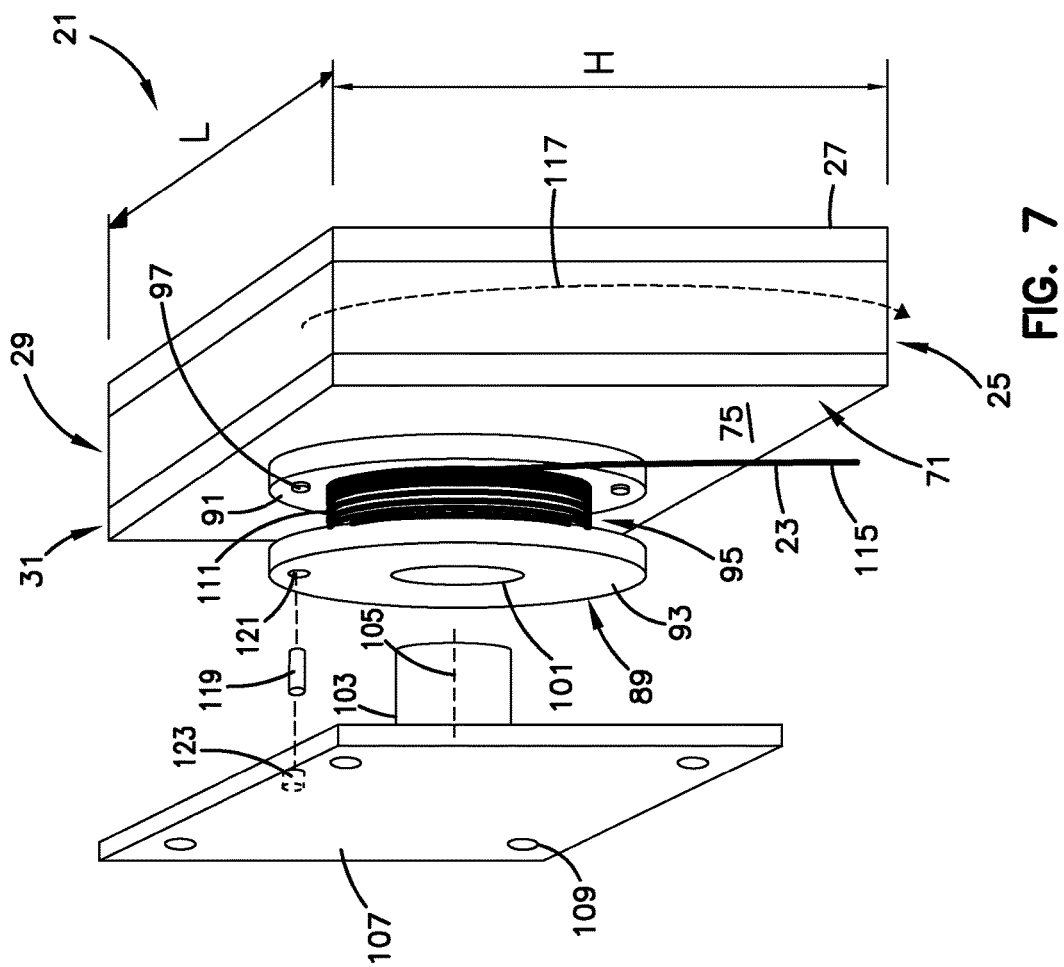
FIG. 7 is a schematic representation of the fiber optic enclosure of FIG. 2.

Referring now to FIG. 7, a cable spool, generally designated 89, is disposed on the back side 75 of the base 31 such that the cable spool 89 is disposed on the exterior surface of the housing 25. The cable spool 89 includes a first axial end 91, an oppositely disposed second axial end 93, and a spooling portion 95 disposed between the first and second axial ends 91, 93. The first axial end 91 is rigidly engaged with the back side 75 of the base 31. In the subject embodiment, the rigid engagement of the base 31 and the first axial end 91 of the cable spool 89 is provided by a plurality of fasteners 97 (e.g., bolts, screws, rivets, etc.). In a preferred embodiment, the fasteners 97 are countersunk into the first axial end 91 so as not to interfere with the payout of the subscriber cable 22. The fasteners 97 extend through the first axial end 91 of the cable spool 89 and through the mounting holes 87 in the panel 71 such that ends of the fasteners are disposed within the interior region 83 of the housing 25 when the base 31 and termination module 29 are in the closed position. In the subject embodiment, retainers 99 (shown in FIG. 6), such as nuts, rivet heads, cotter pins, etc., maintain the fasteners 97 in the mounting holes 87 and thereby rigidly retain the cable spool 89 to the back side 75 of the base 31.

In one embodiment, outer diameters of the first and second axial ends 91, 93 of the cable spool 89 are greater than or equal to a height H of the fiber optic enclosure 21. In another embodiment, outer diameters of the first and second axial ends 91, 93 of the cable spool 89 are greater than or equal to a length L of the fiber optic enclosure 21. In another embodiment, outer diameters of the first and second axial ends 91, 93 of the cable spool 89 are less than the length L of the fiber optic enclosure 21. In another embodiment, outer diameters of the first and second axial ends 91, 93 of the cable spool 89 are less than the height H of the fiber optic enclosure 21.

In the subject embodiment, the cable spool 89 defines an axial bore 101 that extends through the first and second axial ends 91, 93. The axial bore 101 is adapted to receive a spindle 103 having a central axis 105. The spindle 103 includes a mounting plate 107 having a plurality of mounts 109 for mounting the mounting plate 107 to a wall. As the cable spool 89 is connected to the housing 25, the engagement between the axial bore 101 of the cable spool 89 and the spindle 103 allows the cable spool 89 and the housing 25 of the fiber optic enclosure 21 to rotate unitarily about the central axis 105 of the spindle 103. It will be understood that the term "unitarily" as used in the specification and the claims to describe the rotation of the cable spool 89 and the enclosure 28, or components of the enclosure 28, means that the cable spool and the enclosure 28 rotate in unison. In a preferred embodiment, a bearing (e.g., a needle bearing, ball bearing, roller bearing, bushing, etc.) is disposed between the axial bore 101 and the spindle 103.

Referring still to FIG. 7, the subscriber cable 22 is coiled around the spooling portion 95 of the cable spool 89. In order to protect the subscriber cable 22 from attenuation resulting from the coiling of the subscriber cable 22 around the spooling portion 95, the cable spool 89 has an outer circumferential surface 111 having a radius that is greater than the minimum bend radius of the subscriber cable 22. The subscriber cable 22 includes a first end 113 (shown in FIG. 6), which is inserted through the cable passage 85 (shown in FIG. 6) in the panel 71, and a second end 115. As previously stated, the subscriber cable 22 can include multiple optical fibers. In the subject embodiment, each of the multiple optical fibers of the first end 113 of the subscriber cable 22 would have a connectorized end that is in connected engagement with the rear side of the termination bank 59. The connectorized ends of the subscriber cable 22 would be adapted for optical connection with connectorized ends of the second cable 23 (shown in FIG. 1A). It will be understood, however, that the scope of the present disclosure is not limited to the first end 113 having connectorized ends since the optical fibers of the first end 113 of the subscriber cable 22 could be spliced to a plurality of pigtails having connectorized ends. In an alternate embodiment, the first end 113 could be optically connected to the second cable 23 by a splice connection disposed within the enclosure 28.

The second end 115 of the subscriber cable 22 is configured for connectivity with the fiber distribution hub 17. However, as shown in FIG. 1, the length of subscriber cable 22 needed between each of the fiber optic enclosures 21 in the facility 13 and the fiber distribution hub 17 will vary depending upon the location of each fiber optic enclosure 21 with respect to the fiber distribution hub 17.

A method of installing and using the fiber optic enclosure 21 to account for the varying lengths of subscriber cable 22 needed between the fiber optic enclosure 21 and the fiber distribution hub 17 will now be described. The fiber optic enclosure 21 provides dual functionality by serving as a storage location for the subscriber cable 22 and by selectively paying out a desired length of the subscriber cable 22.

A first length of subscriber cable 22 is stored in the fiber optic enclosure 21 by coiling the length of subscriber cable 22 around the cable spool 89. The first length of subscriber cable 22 includes an installation length, which is sufficiently long to extend from the mounting location of the enclosure 28 to the fiber distribution hub 17, and an excess length, which is the length of subscriber cable 22 remaining on the cable spool 89 after the installation length has been paid out. In one embodiment, the first length is greater than or equal to about 100 feet. In another embodiment, the first length of subscriber cable 22 is greater than or equal to about 200 feet. In another embodiment, the first length of subscriber cable 22 is greater than or equal to about 300 feet. In another embodiment, the first length of subscriber cable 22 is greater than or equal to about 400 feet. In another embodiment, the first length of subscriber cable 22 is greater than or equal to about 500 feet. In another embodiment, the first length of subscriber cable 22 is in the range of about 100 to about 2,000 feet. In another embodiment, the first length of subscriber cable 22 is in the range of about 100 to about 1,500 feet. In another embodiment, the first length of subscriber cable 22 is in the range of about 500 to about 1,500 feet. In a preferred embodiment, the first length of subscriber cable 22, which is coiled around the cable spool 89, is in the range of 100 to 500 feet. With the cable spool 89 disposed on the exterior surface of the housing 25, the interior region 83 of the housing 25 can be much more compact since a cable storage area is not required in the interior region 83. In addition, the fiber optic enclosure 21 with the cable spool 89 can provide more effective cable management for a greater length of subscriber cable 22 than a fiber optic enclosure without the cable spool 89.

In one embodiment, a second length, or the excess length, of subscriber cable 22 is stored around the cable spool 89 after the first length of subscriber cable 22 has been paid out. If the first length of subscriber cable 22 is greater than the installation length of subscriber cable 22, the second length, or excess length, is stored around the cable spool 89.

The second function of the fiber optic enclosure 21 involves the selective payout of the subscriber cable 22. As previously mentioned, the first end 113 of the subscriber cable 22 is in connected engagement with the termination bank 59, which is disposed in the interior region 83 of the housing 25. In one embodiment, the first end 113 of the subscriber cable 22 is in connected engagement with adapters 401. Yet, even with this engagement between the first end 113 of the subscriber cable 22 and the termination bank 59, the subscriber cable 22 can still be paid out without disrupting the connection between the first end 113 and the adapter 401 as the cable spool 89 and the adapters rotate about an axis in unison. As previously stated, the cable spool 89 is rigidly engaged with the housing 25 and the axial bore 101 of the cable spool 89 is engaged with the spindle 103 such that the cable spool 89 and housing 25 can selectively rotate about the central axis 105 of the spindle 103. Therefore, with the spindle 103 mounted to the wall and the fiber optic enclosure 21 engaged with the spindle 103, the desired length of the subscriber cable 22 can be paid out from the fiber optic enclosure 21 by rotating the fiber optic enclosure 21 in a rotational direction 117 (shown as a dashed arrow in FIG. 7) about the central axis 105 of the spindle 103. Since the housing 25 and the cable spool 89 rotate unitarily about the central axis 105 of the spindle 103, the second end 115 of the subscriber cable 22 can be paid out without the first end 113 of the subscriber cable 22 being pulled out of the termination bank 59. Once the desired length of subscriber cable 22 has been paid out, the rotation of the fiber optic enclosure 21 is ceased. At this point, the position of the fiber optic enclosure 21 can be fixed such that it does not rotate relative to the spindle 103. In the subject embodiment, a pin 119 is inserted through an opening 121 in the second axial end 93 of the cable spool 89 and through a corresponding opening 123 in the mounting plate 107 to fix the position of the fiber optic enclosure 21. In a preferred embodiment, the fiber optic enclosure 21 is fixed in position when the fiber optic enclosure 21 is generally level.

An alternate method of selectively paying-out subscriber cable 22 from the fiber optic enclosure 21 will now be described. With the fiber optic enclosure 21 positioned near the fiber distribution hub 17, the second end 115 of the subscriber cable 22 is unwound from the cable spool 89. In one embodiment, the second end 115 is optically connected to the fiber distribution hub 17. With the second end 115 of the subscriber cable 22 optically connected to the fiber distribution hub 17 and the first end 113 of the subscriber cable 22 in connected engagement with the termination bank 59, the fiber optic enclosure 21 is transported away from the fiber distribution hub 17. In one embodiment, the fiber optic enclosure 21 is carried away from the fiber distribution hub 17 by an installer. In another embodiment, the fiber optic enclosure 21 is transported away from the fiber distribution hub 17 in a wheeled cart (e.g., dolly, 4-wheeled cart, etc.). In a preferred embodiment, the fiber optic enclosure is disposed in a packaging enclosure (e.g., a box) during transport. As the fiber optic enclosure 21 is transported away from the fiber distribution hub 17, the subscriber cable 22 unwinds from the cable spool 89 causing the cable spool 89 and the housing 25 to rotate within the packaging enclosure. When the fiber optic enclosure 21 has been transported to its mounting location, the fiber optic enclosure 21 is removed from the packaging enclosure, mounted to the mounting location and fixed in position.

Figure 8:
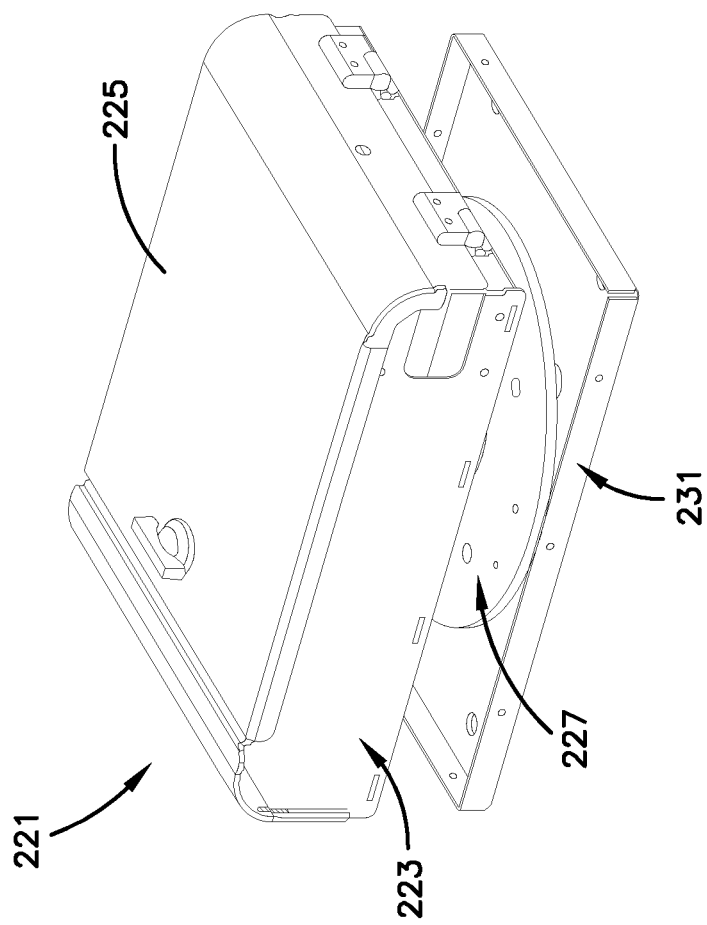
FIG. 8 is an isometric view of the fiber optic enclosure of FIG. 1.
Figure 9:
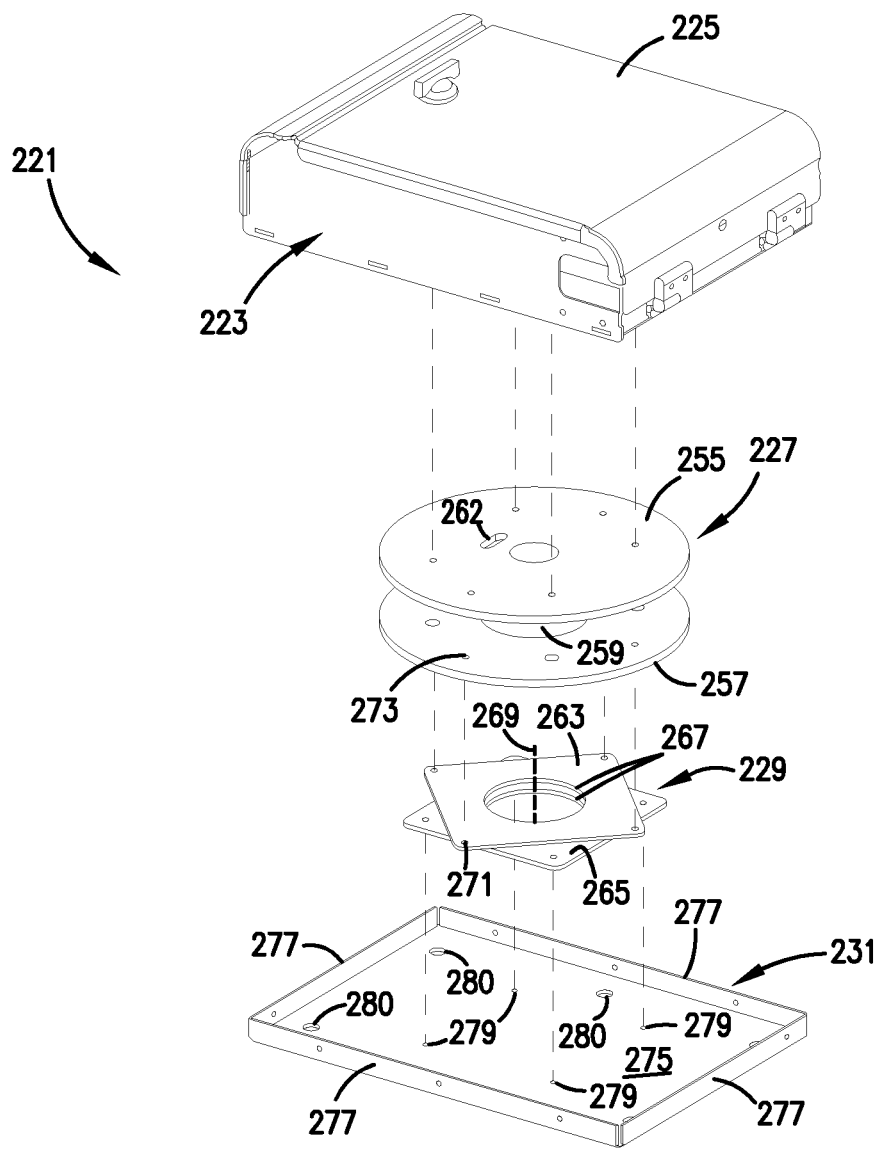
FIG. 9 is an exploded isometric view of the fiber optic enclosure of FIG. 8.
Figure 10:
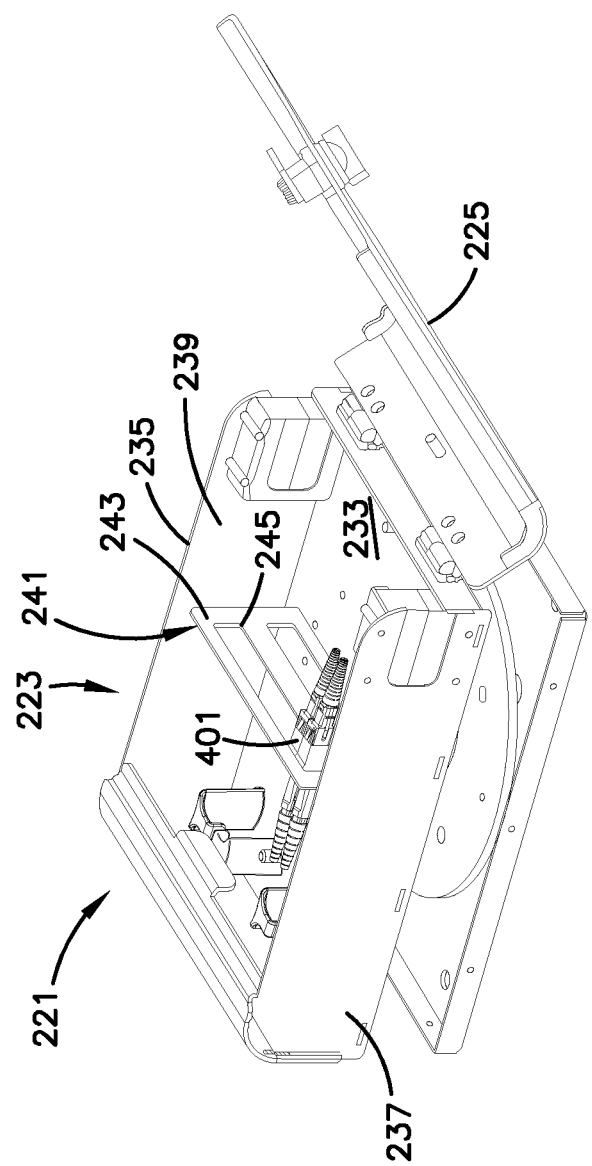
FIG. 10 is an isometric view of the fiber optic enclosure of FIG. 8 with a cover in an open position.

Referring now to FIGS. 8 and 9, an alternate embodiment of a fiber optic enclosure 221 is shown. The fiber optic enclosure 221 includes a housing, generally designated 223 a cable spool, generally designated 227, a bearing mount, generally designated 229 (shown in FIG. 9), and a mounting plate, generally designated 231. Referring now to FIG. 10, the housing 223 includes a cover 225, a base 233, a first sidewall 235, and an oppositely disposed second sidewall 237. The first and second sidewalls 235, 237 extend outwardly from the base 233 such that the base 233 and the first and second sidewalls 235, 237 cooperatively define an interior region 239.

A termination module, generally designated 241, is disposed in the interior region 239 of the housing 223. The termination module 241 of the fiber optic enclosure 221 serves as the dividing line between the incoming fibers and the outgoing fibers. In the subject embodiment, the termination module 241 is mounted to the base 233 of the housing 223.

In the subject embodiment, the termination module 241 includes an adapter plate 243 having adapter slots 245. The adapter slots 245 are adapted to receive the plurality of adapters 401 (shown in FIGS. 3 and 4).

Figure 11:
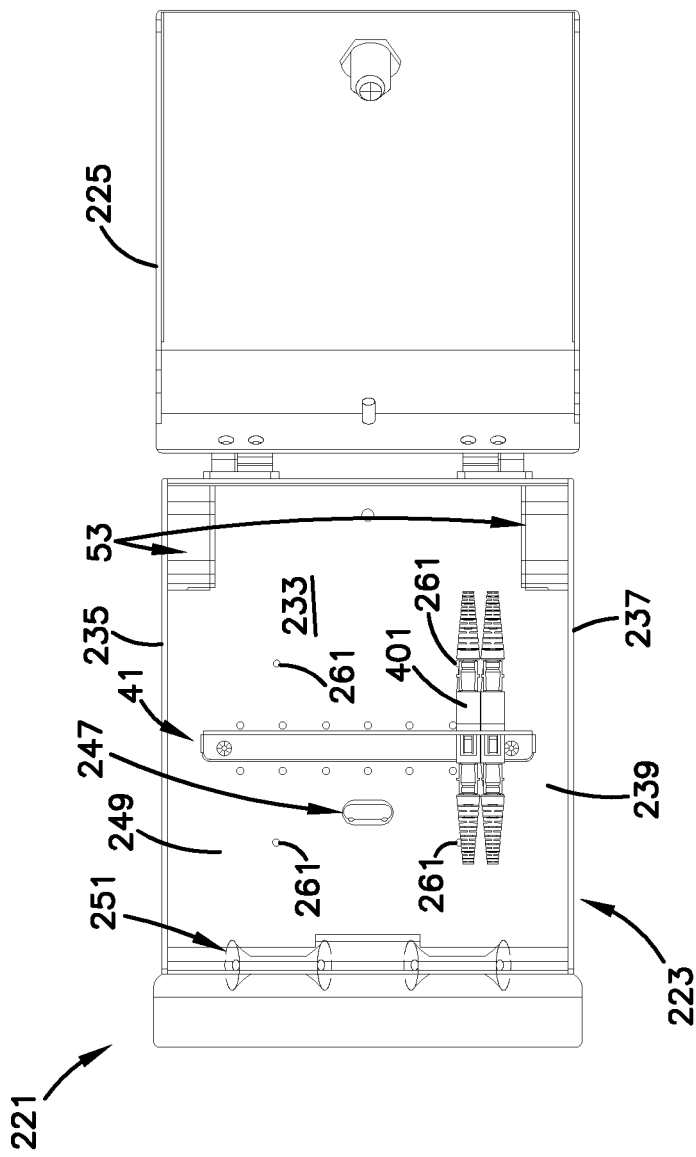
FIG. 11 is a front view of the fiber optic enclosure of FIG. 10.

Referring now to FIG. 11, the base 233 of the housing 223 defines a cable passage 247 through which incoming optical fibers pass. The interior region 239 of the housing 223 includes a slack storage area 249 in which is disposed a plurality of bend radius protectors 251. Each of the bend radius protectors 251 is sized such that an outer radius of the bend radius protector 251 is larger than the minimum bend radius of the optical fiber so as to avoid attenuation damage to the optical fibers during storage. In the subject embodiment, the cable passage 247 is disposed between the slack storage area 249 and the termination module 241. As incoming optical fibers pass through the cable passage 247, the incoming optical fibers are routed to the slack storage area 249. Connectorized ends of the incoming optical fibers are then routed from the slack storage area 249 to the front sides 413 of the adapters 401. Connectorized ends of outgoing optical fibers are routed from the back sides of the adapters 401 and through fiber exit ports 253 which are disposed in the first and second sidewalls 235, 237.

Referring now to FIG. 9, the cable spool 227 is disposed on an exterior of the housing 223. In the subject embodiment, the cable spool 227 is disposed on the back side of the base 233. The cable spool 227 includes a first axial end 255, an oppositely disposed second axial end 257, and a spooling portion 259 disposed between the first and second axial ends 255, 257. The first axial end 255 is rigidly engaged (i.e., non-rotatable) to the back side of the base 233. In the subject embodiment, the rigid engagement of the base 233 and the first axial end 255 of the cable spool 227 is provided by a plurality of fasteners (e.g., bolts, screws, rivets, etc.). In one embodiment, the fasteners are countersunk into the first axial end 255 so as not to interfere with the payout of a subscriber cable 222. The fasteners extend through the first axial end 255 of the cable spool 227 and through a plurality of mounting holes 261 (shown in FIG. 11) in the base 233 such that ends of the fasteners are disposed within the interior region 239 of the housing 223. In order to retain the cable spool 227 to the back side of the base 233, the fasteners may be threaded into the base 233 or retained by a plurality of retainers, such as nuts, rivet heads, cotter pins, etc.

The first axial end 255 of the cable spool 227 includes a passage 262. During engagement of the first axial end 255 and the back side of the base 233 of the housing 223, the first axial end 255 of the cable spool 227 is mounted to the base 233 such that the passage 262 is aligned with the cable passage 247. With the passage 262 of the cable spool 227 and the cable passage 247 of the base 233 aligned, incoming optical fibers, which are coiled around the spooling portion 259 of the cable spool 227, can enter the housing 223.

The bearing mount 229 includes a first plate 263 and a second plate 265. In the subject embodiment, each of the first and second plates 263, 265 of the bearing mount 229 includes a central hole 267 having a central axis 269 (shown as a dashed line in FIG. 3). The first and second plates 263, 265 are connectedly engaged through a bearing, such as a ball bearing. The bearing allows the second plate 265 to rotate about the central axis 269 when the first plate 263 is fixed.

The first plate 263 of the bearing mount 229 is rigidly engaged to the second axial end 257 of the cable spool 227. In the subject embodiment, the rigid engagement of the first plate 263 of the bearing mount 229 and the second axial end 257 of the cable spool 227 is provided by a plurality of fasteners (e.g., bolts, screws, rivets, etc.). The fasteners extend through a plurality of mounting holes 271 in the first plate 263 of the bearing mount 229 and through a plurality of mounting apertures 273 in the second axial end 257 of the cable spool 227.

The second plate 265 of the bearing mount 229 is rigidly engaged to the mounting plate 231. The mounting plate 231 includes a base panel 275 and a plurality of sidewalls 277 that extend outwardly from the base panel 275. The base panel 275 includes a plurality of holes 279 for rigidly engaging the base panel 275 to the second plate 265 of the bearing mount 229. In the subject embodiment, a plurality of fasteners (e.g., bolts, screws, rivets, etc.) provides the rigid engagement of the base panel 275 and the second plate 265. The base panel 275 further includes a plurality of apertures 280 for mounting the fiber optic enclosure 221 to a wall.

Figure 12:
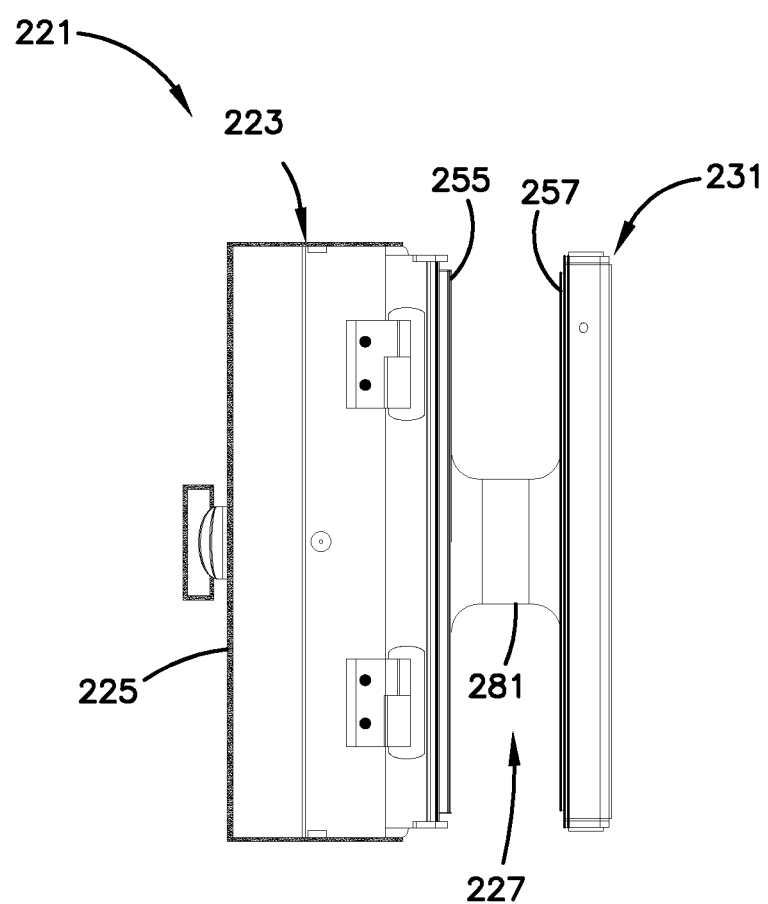
FIG. 12 is a right side view of the fiber optic enclosure of FIG. 8.
Figure 13:
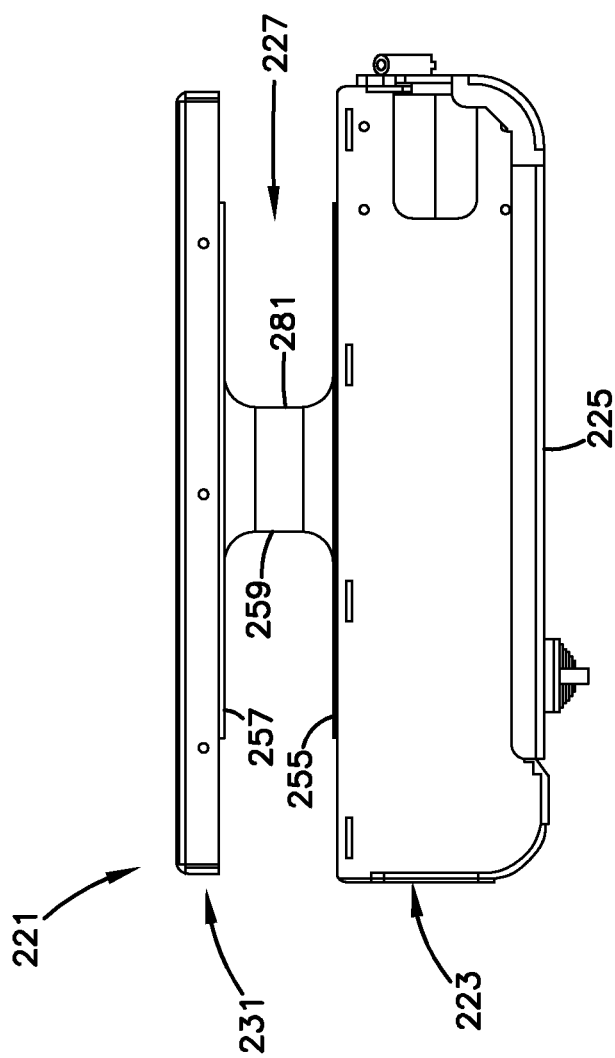
FIG. 13 is top view of the fiber optic enclosure of FIG. 8.

Referring now to FIGS. 1, 12 and 13, the subscriber cable 22, which includes multiple optical fibers, is coiled around the spooling portion 259 of the cable spool 227. In order to protect the subscriber cable 22 from attenuation resulting from the coiling of the subscriber cable 22 around the spooling portion 259, the cable spool 227 has an outer circumferential surface 281 having a radius that is greater than the minimum bend radius of the subscriber cable 22. The subscriber cable 22 includes a first end having connectorized ends, which are inserted through the passage 262 and the cable passage 247 and connectedly engaged with the first end 413 of the adapter 401. The second end of the subscriber cable 22 is configured for connectivity with the fiber distribution hub 17. However, as shown in FIG. 1, the length of subscriber cable 22 needed between each of the fiber optic enclosures 221 in the facility 13 and the fiber distribution hub 17 will vary depending upon the location of each fiber optic enclosure 221 with respect to the fiber distribution hub 17.

A method of selectively paying-out the subscriber cable 22 will now be described. As previously mentioned, the first end of the subscriber cable 22 is in connected engagement with the termination module 241, which is disposed in the interior region 239 of the housing 223. With the first end of the subscriber cable 22 in connected engagement with the front sides 413 of the adapters 401 and the outgoing optical fibers disengaged from the back sides of the adapters 401, the subscriber cable 22 can be paid out. As previously stated, the first axial end 255 of the cable spool 227 is rigidly engaged to the housing 223 and the second axial end 257 of the cable spool 227 is engaged with the first plate 263 of the bearing mount 229 such that the cable spool 227 and housing 223 can selectively rotate about the central axis 269 of the bearing mount 229. Therefore, with the second plate 265 of the bearing mount 229 mounted to the mounting plate 231, which is mounted to a wall, the desired length of the subscriber cable 22 can be paid out from the fiber optic enclosure 221 by rotating the fiber optic enclosure 21 in a rotational direction about the central axis 269 of the bearing mount 229. Since the housing 223 and the cable spool 227 rotate unitarily about the central axis 269 of the bearing mount 229, the second end of the subscriber cable 22 can be paid out without the first end of the subscriber cable 22 being pulled out of the termination module 241. Once the desired length of subscriber cable 22 has been paid out, the rotation of the fiber optic enclosure 221 is ceased. At this point, the position of the fiber optic enclosure 221 can be fixed such that it does not rotate relative to the bearing mount 29.

Figure 14:
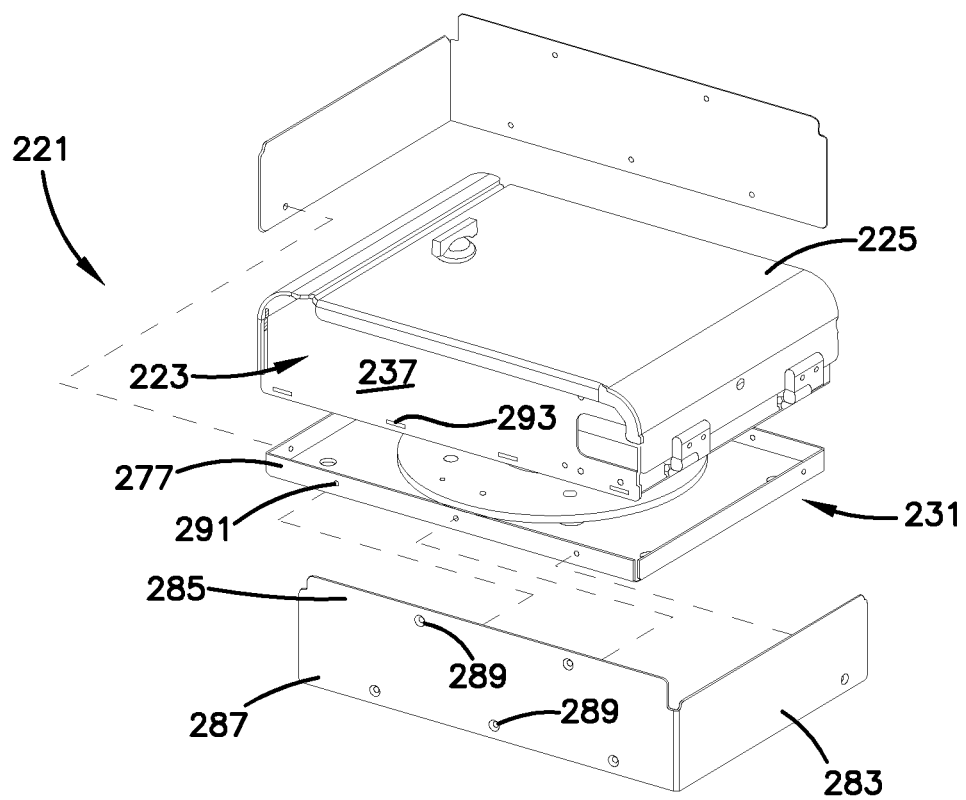
FIG. 14 is an exploded isometric view of the fiber optic enclosure of FIG. 8 with a bracket.

Referring now to FIG. 14, a bracket 283 can be used to secure the position of the fiber optic enclosure 221 after the rotation of the fiber optic enclosure 221 has ceased. In the subject embodiment, the bracket 283 is an L-shaped bracket having an upper portion 285 and a lower portion 287. It will be understood, however, that the scope of the present disclosure is not limited to the bracket 283 being an L-shaped bracket. A plurality of thru-holes 289 are defined in the upper and lower portions 285, 287 of the bracket 283. The thru-holes 289 in the lower portion 287 of the bracket 283 align with holes 291 in the sidewalls 277 of the mounting plate 231 while the thru-holes 289 in the upper portion 285 of the bracket 283 align with holes 293 in the first and second sidewalls 235, 237. In the subject embodiment, fasteners are inserted through the thru-holes 289 in the upper and lower portions 285, 287 of the bracket 283 and connectedly engaged to the housing 223 and the mounting plate 231, respectively. With the bracket 283 engaged with the housing 223 and the mounting plate 231, the housing 223 and cable spool 227 cannot move relative to the mounting plate 231, thereby fixing the position of the fiber optic enclosure 221.

In an alternative method of installing and using the fiber optic enclosure 221 to account for varying lengths of subscriber cable 22, the cable spool 227 is disengaged from the housing 223. The subscriber cable 22 is then paid out from the cable spool 227 such that the cable spool 227 rotates about the central axis 259 of the bearing mount 229. With the desired length of subscriber cable 22 paid out, the housing 223 is then engaged to the first axial end 255 of the cable spool 227. The connectorized ends of the first end of the subscriber cable 22 are passed through the passage 262 in the first axial end 255 of the cable spool 227 and through the cable passage 247 in the base 233 of the housing 223. With the connectorized ends of the subscriber cable 22 disposed in the interior region 239 of the housing 223, the connectorized ends are connectedly engaged with the first ends 413 of the adapters 401 in the termination module 41.

In an alternate method of installing the fiber optic enclosure 221, the cable spool 227 is uncoupled from the housing 223 such that the cable spool 227 can rotate independently from the housing 223. In this alternative method, the connectorized ends of the subscriber cable 22 are disengaged from the first ends 413 of the adapters 401 in the termination module 41. With the connectorized ends of the subscriber cable 22 disengaged from the termination module 41, the cable spool 227 is rotated relative to the housing 223 so as to pay out the subscriber cable 22. In one embodiment, the fiber optic enclosure 221 is mounted to a mounting location. In another embodiment, the fiber optic enclosure 221 is positioned adjacent to the mounting location. In another embodiment, the fiber optic enclosure 221 is positioned adjacent to the mounting location and disposed in a packaging enclosure (e.g., a box).

When a desired length of the subscriber cable 22 has been paid out, the cable spool 227 is coupled to the housing 223 and the connectorized ends of the subscriber cable 22 are engaged to the termination module 41. In one embodiment, the fiber optic enclosure 221 is then mounted to the mounting location.

Referring now to FIGS. 15-19, an alternate embodiment of a fiber optic enclosure 421 is shown. The fiber optic enclosure 421 includes a housing, generally designated 423, a cover 425, a cable spool, generally designated 427, the bearing mount 229, and a mounting plate, generally designated 431.

In the subject embodiment, the housing 423 includes a base 433, a first sidewall 435, and an oppositely disposed second sidewall 437. The first and second sidewalls 435, 437 extend outwardly from the base 433 such that the base 433 and the first and second sidewalls 435, 437 cooperatively define an interior region 439.

A termination module, generally designated 441, is disposed in the interior region 439 of the housing 423. In the subject embodiment, the termination module 441 is mounted to the base 433 of the housing 423. The termination module 441 includes a plurality of sliding adapter modules 442. Similar sliding adapter modules 442 have been described in detail in commonly owned U.S. Pat. Nos. 5,497,444; 5,717, 810, 6,591,051 and U.S. Pat. Pub. No. 2007/0025675, the disclosures of which are incorporated herein by reference.

The interior region 439 of the housing 423 includes a slack storage area 449 in which is disposed a cable management spool 451. The cable management spool 451 includes a passage 447 that extends through the center of the cable management spool 451 and through the base 433 of the housing 423. The passage 447 allows the connectorized ends of the subscriber cable 22 to pass into the housing 423.

Figure 15:
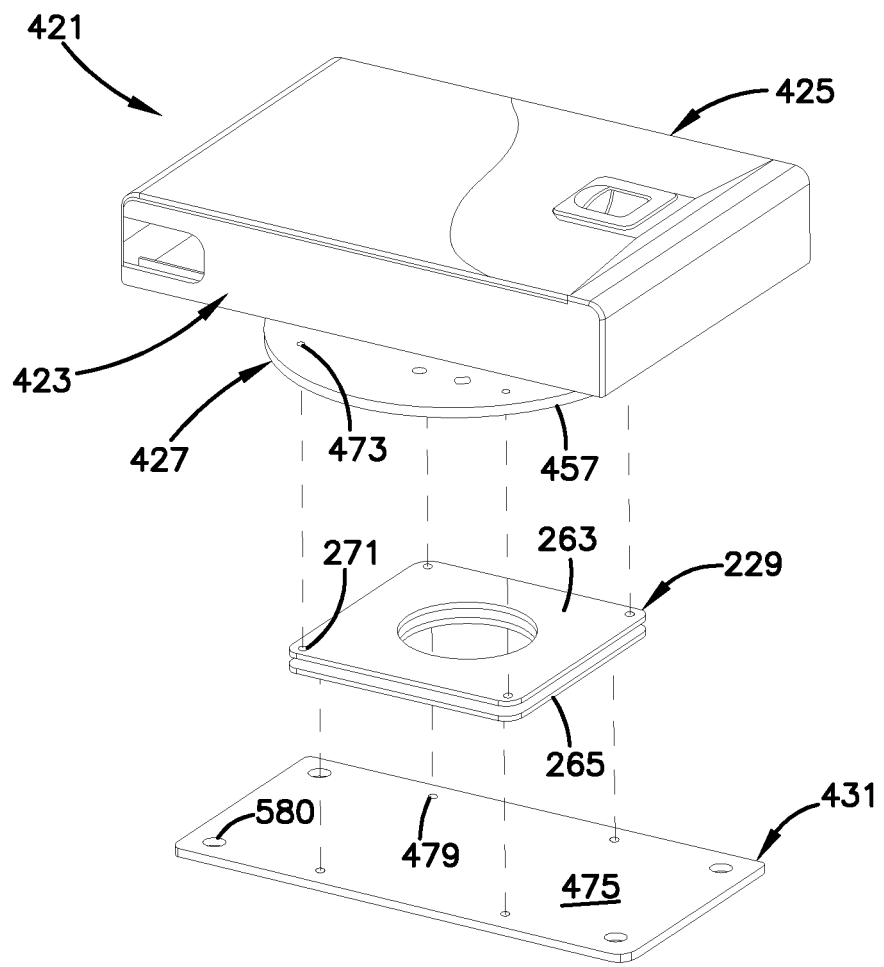
FIG. 15 is an exploded isometric view of an alternate embodiment of a fiber optic enclosure having features that are examples of inventive aspects in accordance with the principles of the present disclosure.
Figure 16:
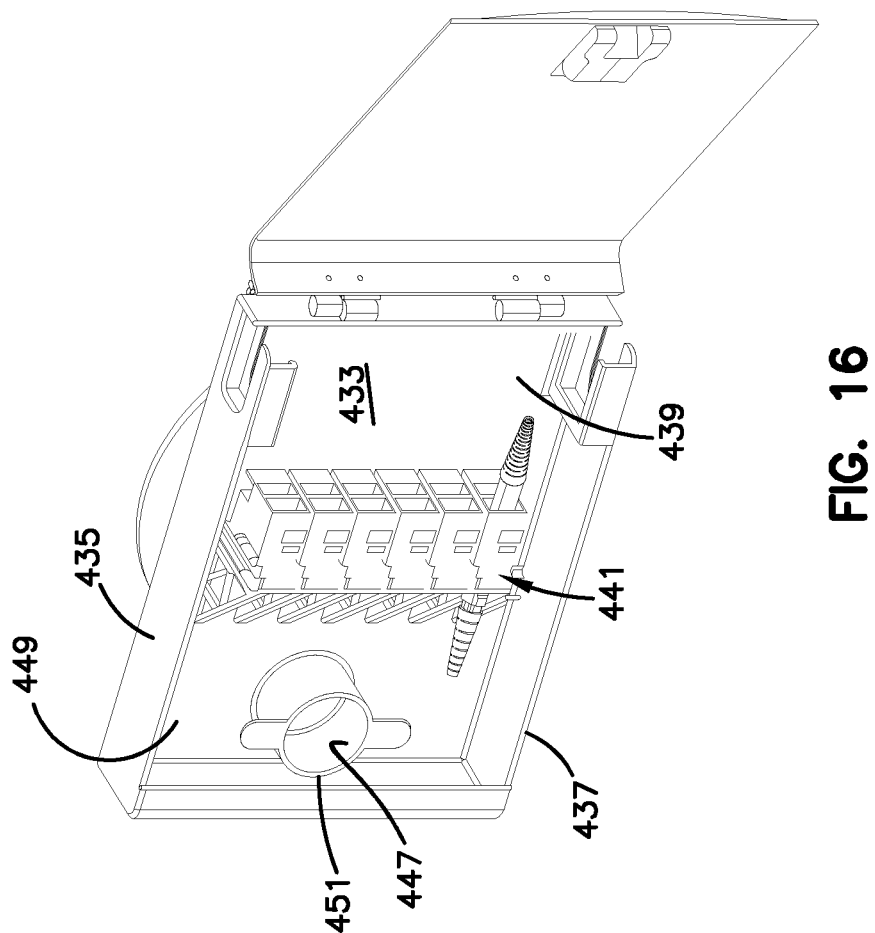
FIG. 16 is an isometric view of the fiber optic enclosure of FIG. 15 with a cover in an open position.
Figure 17:
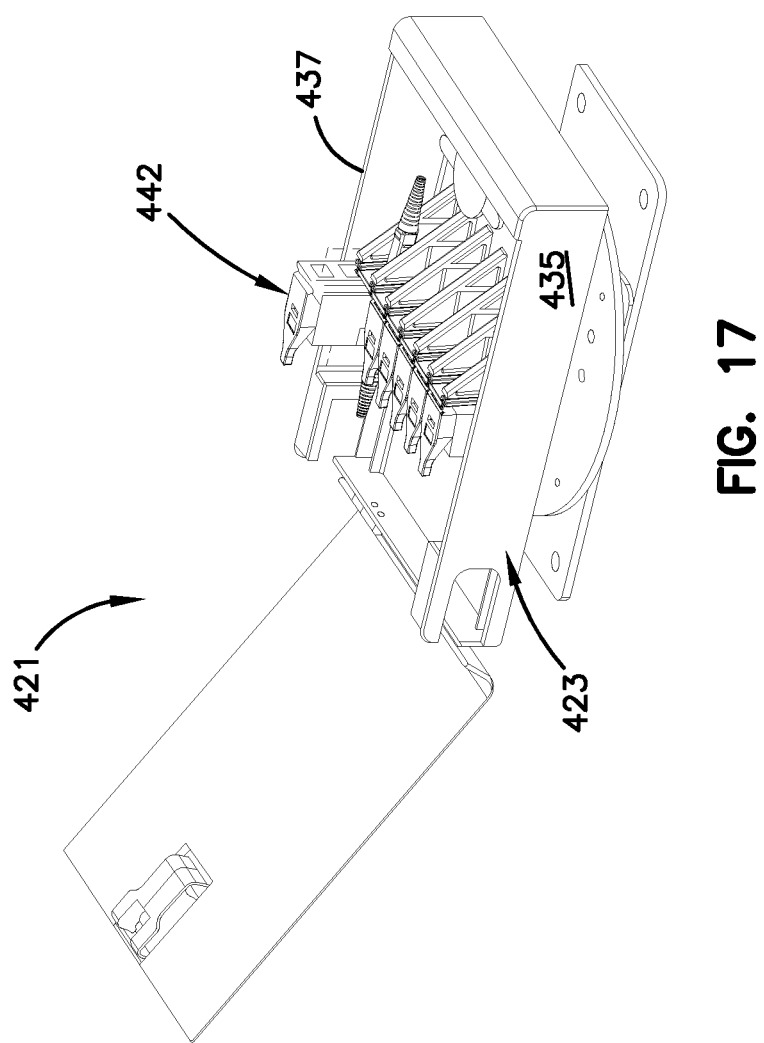
FIG. 17 is an isometric view of the fiber optic enclosure of FIG. 15 with a cover in an open position.
Figure 18:
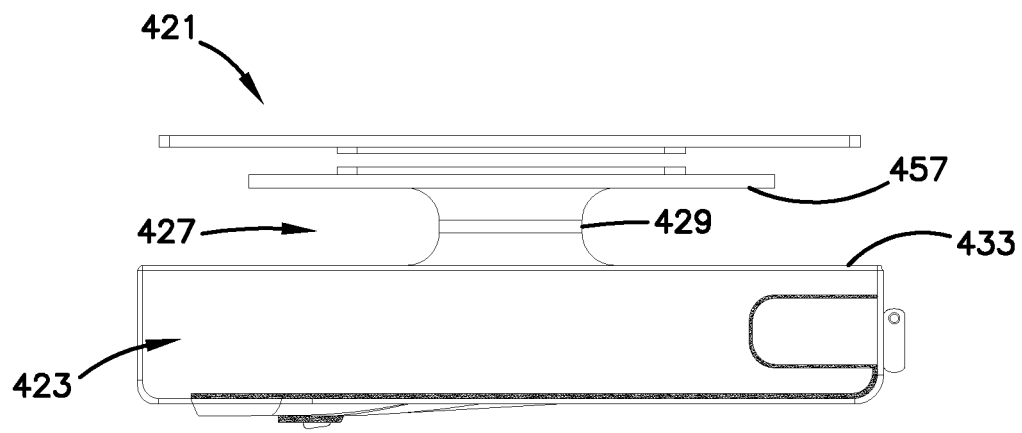
FIG. 18 is top view of the fiber optic enclosure of FIG. 15.
Figure 19:
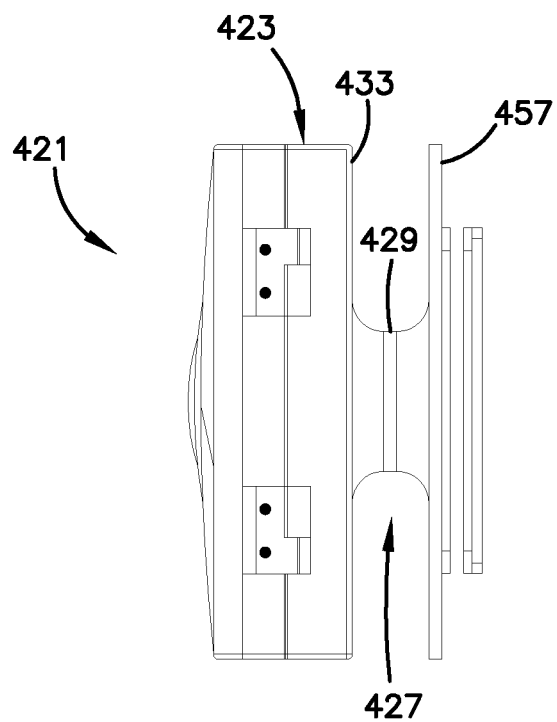
FIG. 19 is a right side view of the fiber optic enclosure of FIG. 15.

Referring now to FIGS. 15, 18 and 19, the cable spool 427 is disposed on the exterior of the housing 423. In the subject embodiment, the cable spool 427 is disposed on the back side of the base 433. In this alternate embodiment of the fiber optic enclosure 421, the cable spool 427 is integrally formed or molded with the housing 423 such that a spooling portion 429 of the cable spool 427 protrudes from the base 433 of the housing 423. With the cable spool 427 integrally formed with the housing 423, the base 433 serves both as the base 433 of the housing 423 and as a first axial end of the cable spool 427. The cable spool 427 further includes a second axial end 457, which is oppositely disposed from the base 433.

The first plate 263 of the bearing mount 229 is rigidly engaged with the second axial end 457 of the cable spool 427. In the subject embodiment, the rigid engagement of the first plate 263 and the second axial end 457 is provided by a plurality of fasteners (e.g., bolts, screws, rivets, etc.). The fasteners extend through the plurality of mounting holes 271 in the first plate 263 of the bearing mount 229 and through a plurality of mounting apertures 473 in the second axial end 457 of the cable spool 427.

The second plate 265 of the bearing mount 229 is rigidly engaged with the mounting plate 431. In the subject embodiment, the mounting plate 431 includes a base panel 475 having a plurality of holes 479 for rigidly engaging the base panel 475 to the second plate 265 of the bearing mount 229. In the subject embodiment, a plurality of fasteners (e.g., bolts, screws, rivets, etc.) provides the rigid engagement of the base panel 275 and the second plate 265. The base panel 475 further includes a plurality of apertures 480 for mounting the fiber optic enclosure 421 to a wall.

As previously stated, while the cable spool 427 has been described as extending from the back side of the base 433 of the housing 423, it will be understood that the scope of the present disclosure is not limited to such a configuration. In an alternate embodiment of the fiber optic enclosure, a spooling portion of a cable spool could provide sidewalls of a housing, where the spooling portion and a base cooperate to define an interior region of the housing.

Figure 20:
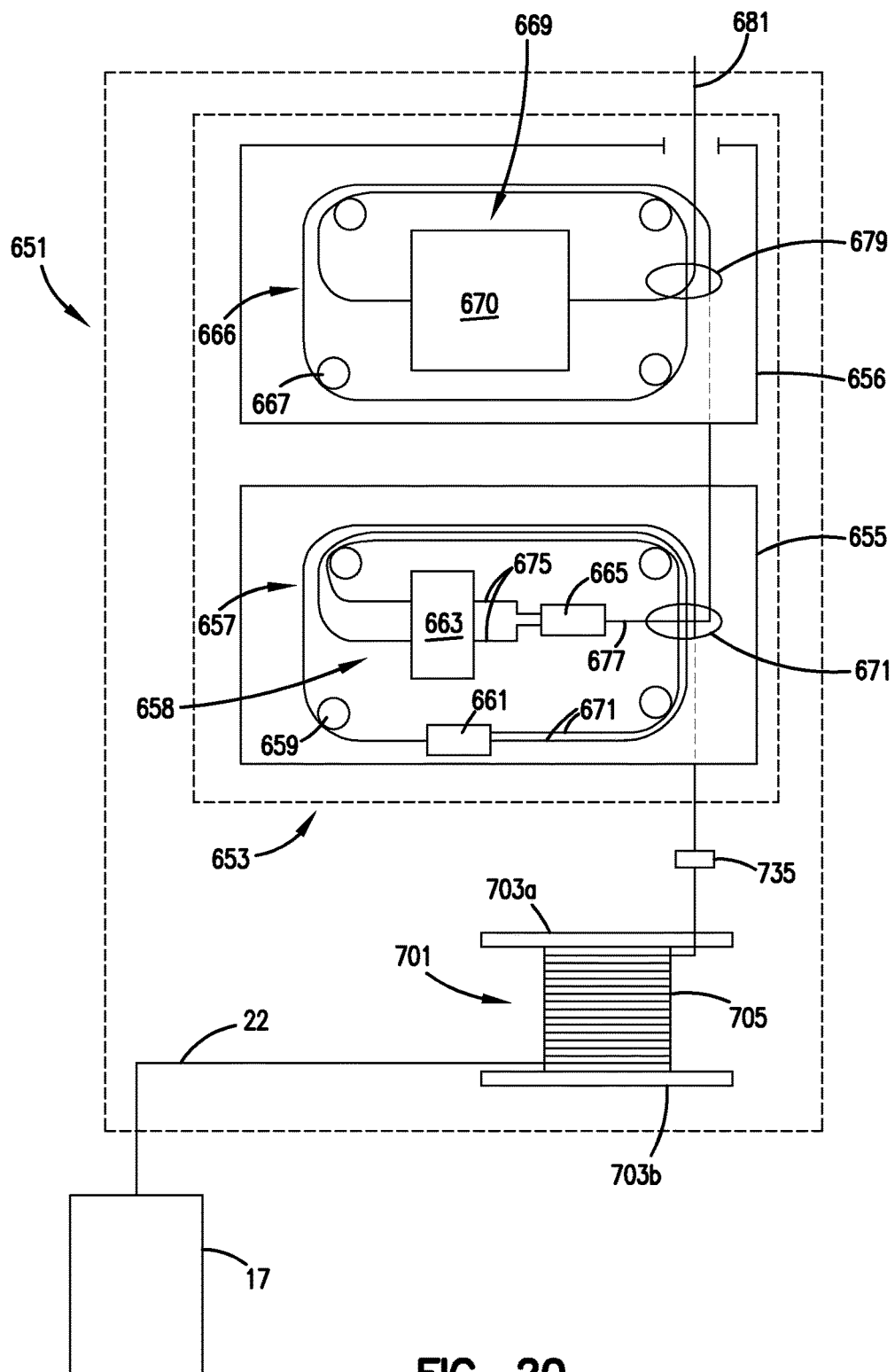
FIG. 20 is a schematic representation of a fiber optic enclosure having features that are examples of aspects in accordance with the principles of the present disclosure.

Referring now to FIG. 20, a schematic representation of an alternate embodiment of a fiber optic enclosure 651 is shown. The fiber optic enclosure 651 includes a housing 653 having a first portion 655 and a second portion 656. In one embodiment, the first portion 655 and the second portion 656 are engaged by a hinge.

The first portion 655 includes a first slack storage area 657 and a termination module 658. The slack storage area 657 includes a first plurality of bend radius protectors 659, which provides organization of the incoming and outgoing cable within the first portion 655 and avoids attenuation damage to the optical fibers during storage, and a first fanout 661. The termination module 658 of the first portion 655 includes an adapter module 663 and a second fanout 665.

The second portion 656 includes a second slack storage area 666 having a second plurality of bend radius protectors 667 and a splice module 669. The splice module 669 includes a splice tray 670 for optically connecting optical fibers.

Disposed on an exterior surface of the housing 653 is a cable spool assembly 701. The cable spool assembly 701 includes a first end 703a, an oppositely disposed second end 703b, and a drum portion 705 around which the subscriber cable 22 is coiled or wrapped.

A first end of the subscriber cable 22 is optically connected with the fiber distribution hub 17. The second end of the subscriber cable 22 is routed through a first passage 671 in the first portion 655 of the housing 653 and into the first fanout 661 where individual fibers 673 of the subscriber cable 22 are separated from one another. The individual fibers 673 include connectorized ends that are routed and connected to a first side of the adapter module 663.

Connectorized ends of individual fibers 675 of a drop cable 677 are connected to a second side of the adapter module 663 and routed to the second fanout 665 where the individual fibers 675 are rejoined into the drop cable 677. The drop cable 677 is then routed through a second passage 679 into the second portion 656 of the housing 653.

The drop cable 677 is routed around the second plurality of bend radius protectors 667 and into the splice tray 670 of the splice module 669 where the drop cable 677 can be connected with a first end of the second cable 23, where the second end of the second cable is adapted for connection at the end location in the facility 13 (shown schematically in FIG. 1).

Before the second cable 23 is spliced to the drop cable 677 at the splice module 669 in the second portion 656 of the housing 653, the first end of the subscriber cable 22 is paid out from the cable spool assembly 701 and routed to the fiber distribution hub 17. As the second end of the subscriber cable 22 is connected to the first side of the adapter module 663 in the first portion 655 of the housing 653, a cable strain relief member 735 is disposed along an intermediate portion of the subscriber cable 22 between the first and second ends of the subscriber cable. The cable strain relief member 735 is adapted to relieve tensile forces that can act on the connectorized ends of the second end of the subscriber cable 22, which are connected to the first side of the adapter module 663 inside the housing 653 of the fiber optic enclosure 651, when an installer tries to pull more subscriber cable 22 from the cable spool assembly 701 than is available.

Figure 21:
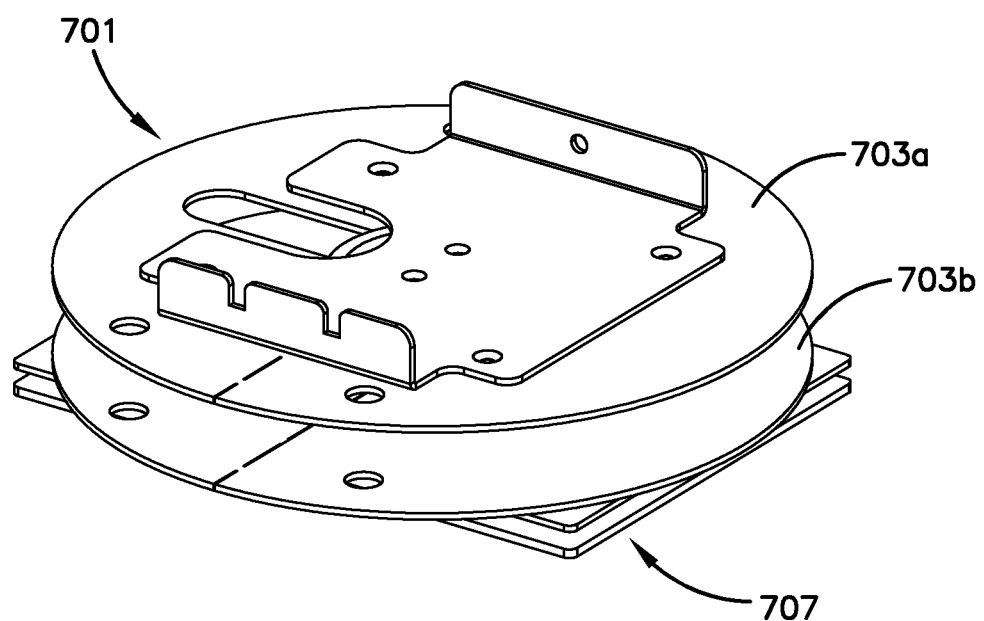
FIG. 21 is a perspective view of an alternate embodiment of a cable spool assembly suitable for use with the fiber optic enclosure of FIG. 8.
Figure 22:
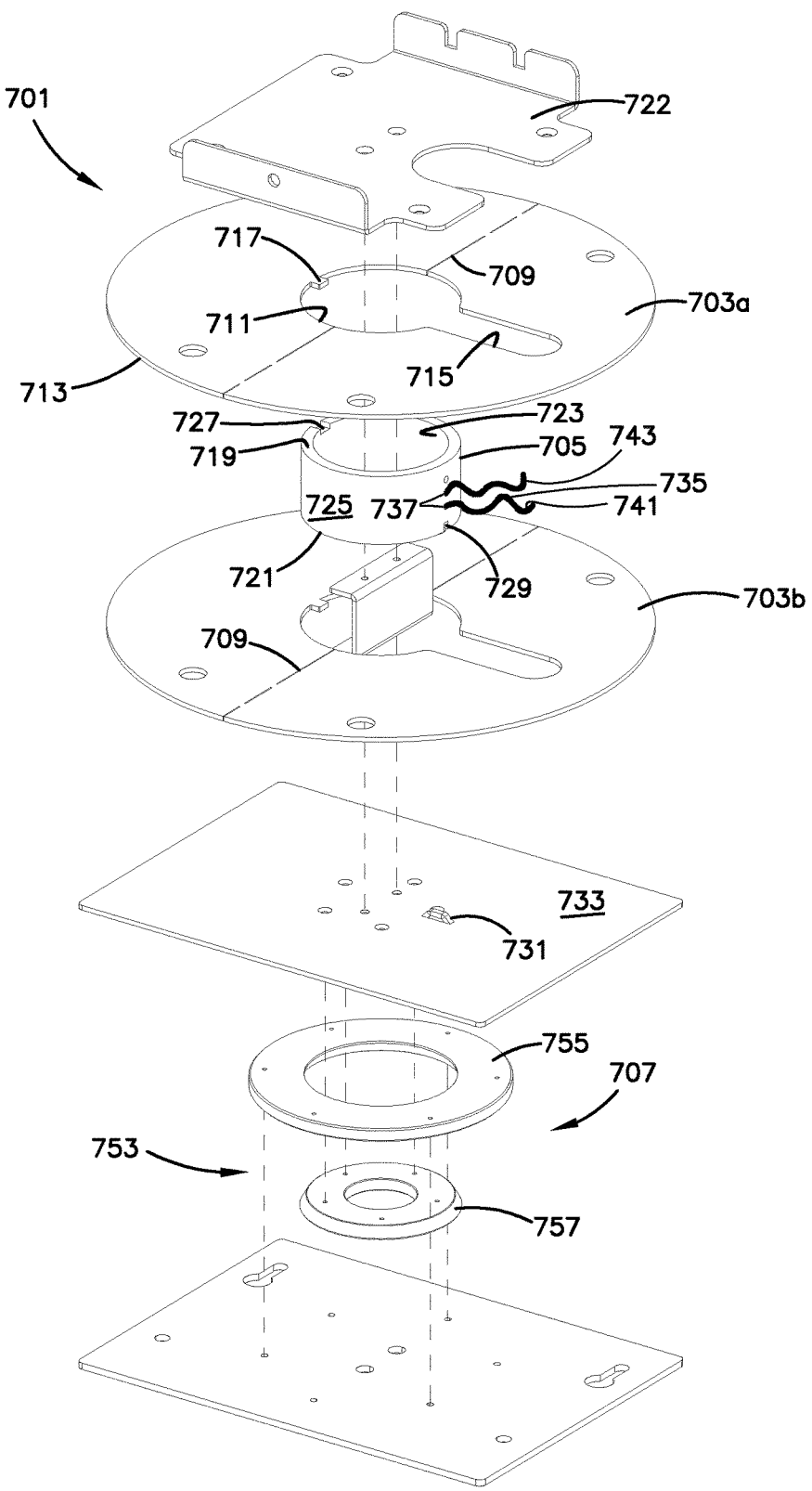
FIG. 22 is an exploded isometric view of the alternate embodiment of the cable spool assembly of FIG. 21.

Referring now to FIGS. 21 and 22, the cable spool assembly 701 is shown. In the subject embodiment, the first and second spool ends 703a, 703b of the cable spool assembly 701 are substantially similar. As the first and second ends 703a, 703b in the subject embodiment are substantially similar, the first and second ends 703a, 703b shall be referred to as spool end 703 in both singular and plural tense as required by context. It will be understood, however, that the scope of the present disclosure is not limited to the first and second ends 703a, 703b being substantially similar.

Each spool end 703 is adapted to be a tear-away end. As a tear-away ends, the spool end 703 includes a line of weakness 709. In the subject embodiment, the line of weakness 709 extends from an inner diameter 711 of the spool end 703 to an outer diameter 713 of the spool end 703.

Each of the spool ends 703 defines an access notch 715 that extends outwardly in a radial direction from the inner diameter 711 and a tab 717 that extends inwardly in a radial direction. The access notch 715 is adapted to provide access to cable wound around the drum portion 705 of the cable spool assembly 701. The access notch 715 is also adapted to provide a location through which the subscriber cable 22 can pass to get access to the passage 447 in the housing 223 of the fiber optic enclosure 421. The tab 717 is adapted for engagement with the drum portion 705 in order to prevent rotation of the spool ends 703 relative to the drum portion 705.

The drum portion 705 is generally cylindrical in shape and includes a first axial end 719 and an oppositely disposed second axial end 721. In the subject embodiment, the first axial end 719 is disposed adjacent to a bracket 722 that is adapted to receive the housing 423 while the second axial end 721 is disposed adjacent to the mounting assembly 707. The drum portion further includes an inner bore 723 and an outer surface 725.

Each of the first and second axial ends 719, 721 defines a groove 727. In the subject embodiment, each groove 727 extends from the inner bore 723 through the outer surface 725 and is adapted to receive the tab 717 from one of the spool ends 703. As previously stated, the engagement of the tab 717 of spool end 703 in the groove 727 of the drum portion 705 prevents rotation of the spool end 703 relative to the drum portion 705.

The second axial end 721 further defines a notch 729. In the subject embodiment, the notch 729 extends from the inner bore 723 through the outer surface 725 and is disposed on the second axial end 721 opposite the groove 727 on the second axial end 721. The notch 729 is adapted to engage a protrusion 731 on a first plate 733 of the mounting assembly 707. The engagement of the notch 729 and the protrusion 731 of the first plate 733 of the mounting assembly 707 prevents relative rotation between the drum portion 705 and the first plate 733 of the mounting assembly 707.

The drum portion 705 is adapted to receive the cable strain relief member 735. As previously mentioned, the cable strain relief member 735 is adapted to relieve tensile forces that can act on the connectorized ends of the subscriber cable 22, which are connected to the adapter modules 441 inside the housing 423 of the fiber optic enclosure 421, when an installer tries to pull more subscriber cable 22 from the cable spool assembly 701 than is available. In the subject embodiment, the cable strain relief member 735 reduces this force acting on the connectorized ends of the subscriber cable 22 by redirecting the force through the cable strain relief member 735 to the drum portion 705 of the cable spool assembly 701.

In one embodiment, the cable strain relief member 735 is a cable tie. In another embodiment, the cable strain relief member 735 is a strip of adhesive. In another embodiment, the cable strain relief member 735 is a protrusion that extends outwardly from the drum portion 705.

In the depicted embodiment of FIG. 22, the outer surface 725 of the drum portion 705 includes a plurality of thru-holes 737. It will be understood, however, that the scope of the present disclosure is not limited to the outer surface 725 including a plurality of thru-holes 737. In the subject embodiment, and by way of example only, there are three thru-holes 737 disposed in the outer surface 725 of the drum portion 705. The thru-holes 737 are adapted to receive the cable strain relief member 735. In subject embodiment, the cable strain relief member 735 is a cable tie 735.

Figure 23:
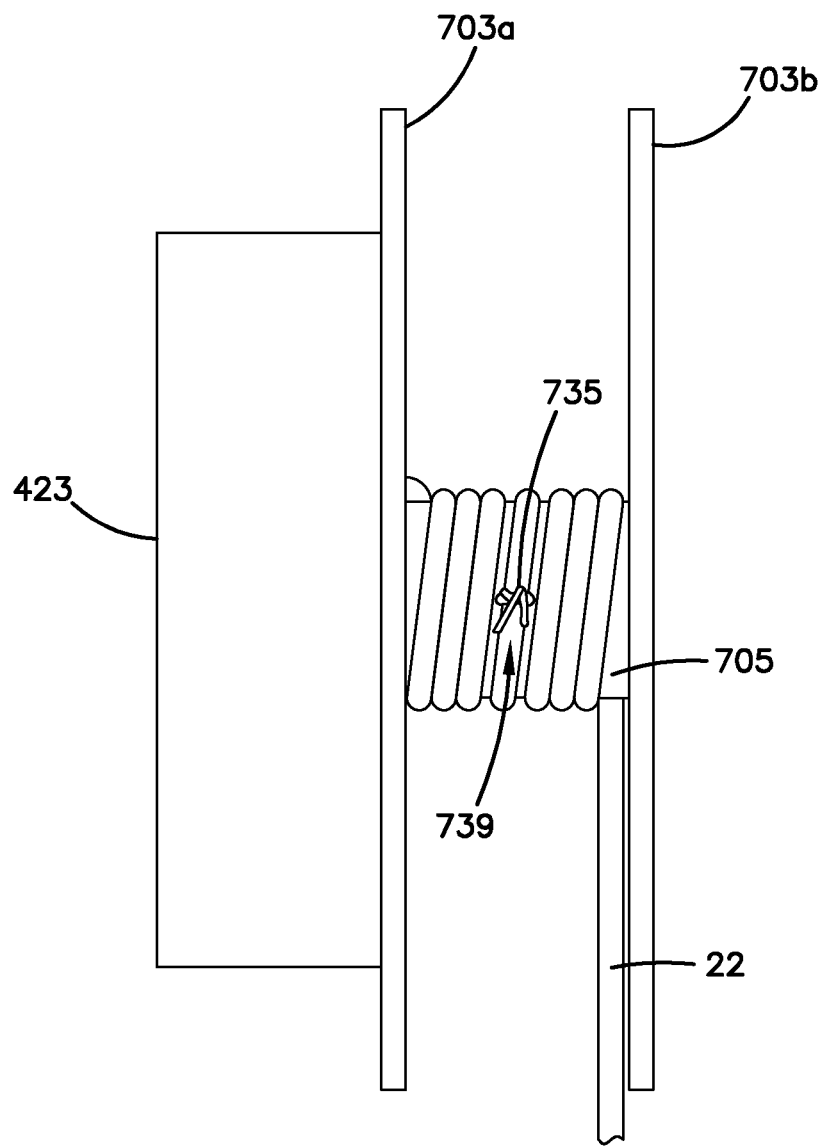
FIG. 23 is a side view of the cable spool assembly of FIG. 21 with a cable strain relief member.

Referring now to FIG. 23, a strain relief arrangement 739 is shown. The strain relief arrangement 739 secures a portion of the subscriber cable 22 to the drum portion 705 of the cable spool assembly 701. In the subject embodiment, the strain relief arrangement 739 secures the portion of the subscriber cable 22 to the drum portion 705 of the cable spool assembly 701 with the cable strain relief member 735. In the depicted embodiment of FIG. 23, the cable strain relief member 735 is the cable tie 735.

In the subject embodiment, a first end 741 (shown in FIG. 22) of the cable tie 735 is inserted through one of the plurality of thru-holes 737 (shown in FIG. 22) in the outer surface 725 of the drum portion 705 while a second end 743 (shown in FIG. 22) of the cable tie 735 is inserted through another of the plurality of thru-holes 737. With the cable tie 735 inserted through the thru-holes 737, a first layer of subscriber cable 22 can be coiled or wound around the drum portion 705. The first layer of subscriber cable 22 is a layer that is immediately adjacent to the outer surface 725 of the drum portion 705. At an intermediate portion of the first layer of the subscriber cable 22, the first and second ends 741, 743 of the cable tie 735 are secured together around the subscriber cable 22. In the depicted embodiment of FIG. 23, and by way of example only, the cable tie 735 secures a single row in the first layer of the subscriber cable 22.

Figure 24:
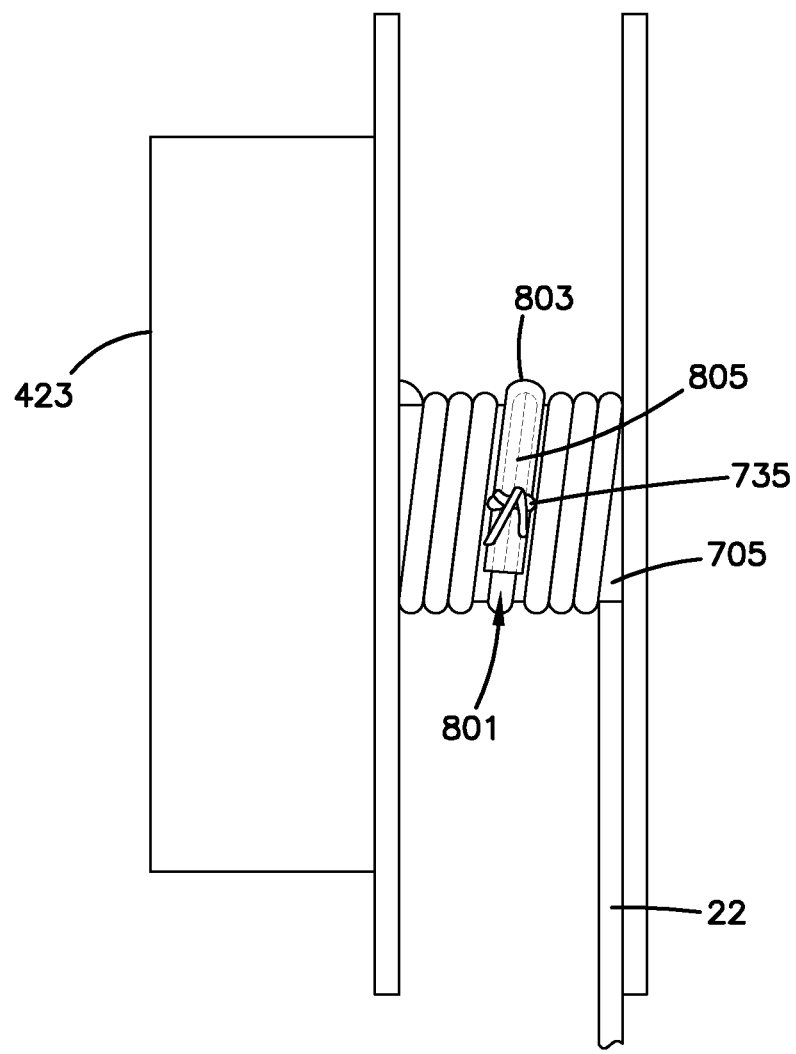
FIG. 24 is a side view of the cable spool assembly of FIG. 21 with an alternate embodiment of a cable strain relief member.

Referring now to FIG. 24, an alternate embodiment of a cable tie arrangement 801 is shown. In this embodiment, the cable tie 735 is secured around a sleeve 803. In the subject embodiment, the sleeve 803 is disposed around a portion of the subscriber cable 22. The sleeve 803 can be a semi-rigid piece of tubing, such as tubing commercially available under the brand name TYGON® or any pneumatic tubing. In one embodiment, the sleeve 803 includes a longitudinal slit 805 through which the subscriber cable 22 can be inserted into the sleeve 803. In one embodiment, the sleeve 803 protects the subscriber cable 22 from potential over tightening of the cable tie 735. In another embodiment, the sleeve 803 can serve as a bend radius protector for the portion of the subscriber cable 22 secured by the cable tie 735. As the subscriber cable 22 reaches its payout length, the cable tie 735 secures a portion of the subscriber cable 22 to the drum portion 705. The sleeve 803 reduces the risk of the subscriber cable 22 bending beyond the minimum bend radius of the cable at the location of the cable tie 735.

Figure 25:
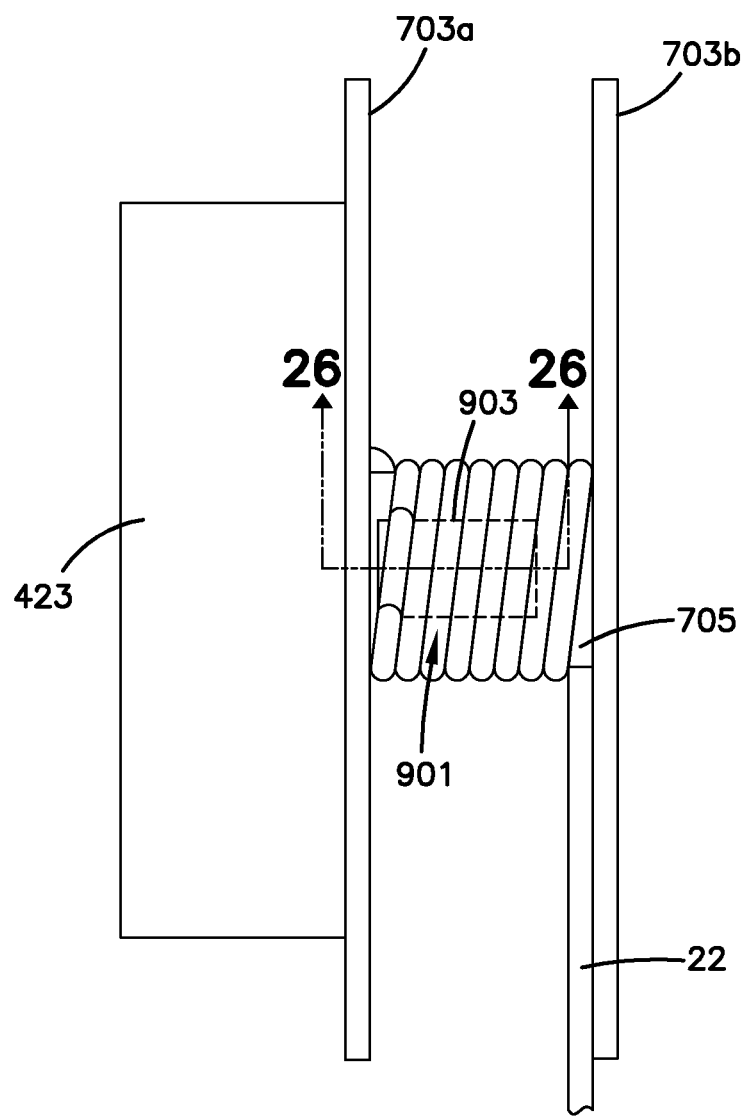
FIG. 25 is a side view of the cable spool assembly of FIG. 21 with an alternate embodiment of a strain relief member.
Figure 26:
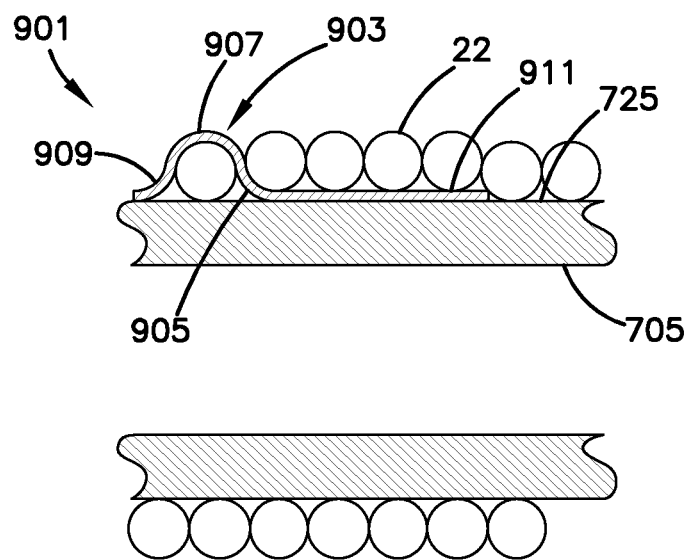
FIG. 26 is a cross-sectional view of the cable spool assembly of FIG. 25 taken on line 26-26 of FIG. 25.

Referring now to FIGS. 25 and 26, an alternate embodiment of a strain relief arrangement 901 is shown. The strain relief arrangement 901 includes a strain relief member 903. In the subject embodiment, the strain relief member 903 is an adhesive sheet 903 having a high-strength adhesive on at least one side. In the subject embodiment, the adhesive sheet 903 includes a first side 905 and an oppositely disposed second side 907. In one embodiment, only the first side 905 includes an adhesive layer. In another embodiment, the first and second sides 905, 907 include an adhesive layer. A suitable example of an adhesive sheet 903 having an adhesive layer on the first and second sides 905, 907 is produced by 3M under the brand VHB™ Tape 4932.

The adhesive sheet 903 further includes a first end portion 909 and an oppositely disposed second end portion 911. In one embodiment, the first side 605 of the first and second end portions 909, 911 of the adhesive sheet 903 is adapted for affixation to the outer surface 725 of the drum portion 705. In the subject embodiment, a portion of the first side 905 is adapted for affixation to the portion of the subscriber cable 22. With the first and second end portions 909, 911 of the adhesive sheet 903 affixed to the outer surface 725 of the drum portion 705, the portion of the subscriber cable 22 disposed under the first side 905 between the first and second end portions 909, 911 is secured to the drum portion 705 of the cable spool assembly 701.

With the portion of the subscriber cable 22 secured to the drum portion 705 by the adhesive sheet 903, a remaining portion of the subscriber cable 22 is coiled or wrapped around the drum portion 705. In the embodiment in which the first and second sides 905, 907 include the layer of adhesive, the remaining subscriber cable 22 that is positioned over the second end portion 911 of the second side 907 is releasably affixed to the drum portion 705. This releasable affixation of the remaining portion of the subscriber cable 22 to the second side 907 of the adhesive sheet 903 decreases the spinning speed of the cable spool assembly 701 as the subscriber cable 22 approaches its total payout length by providing resistance to the removal of that remaining portion of the subscriber cable 22 from the drum portion 705.

Figure 27:
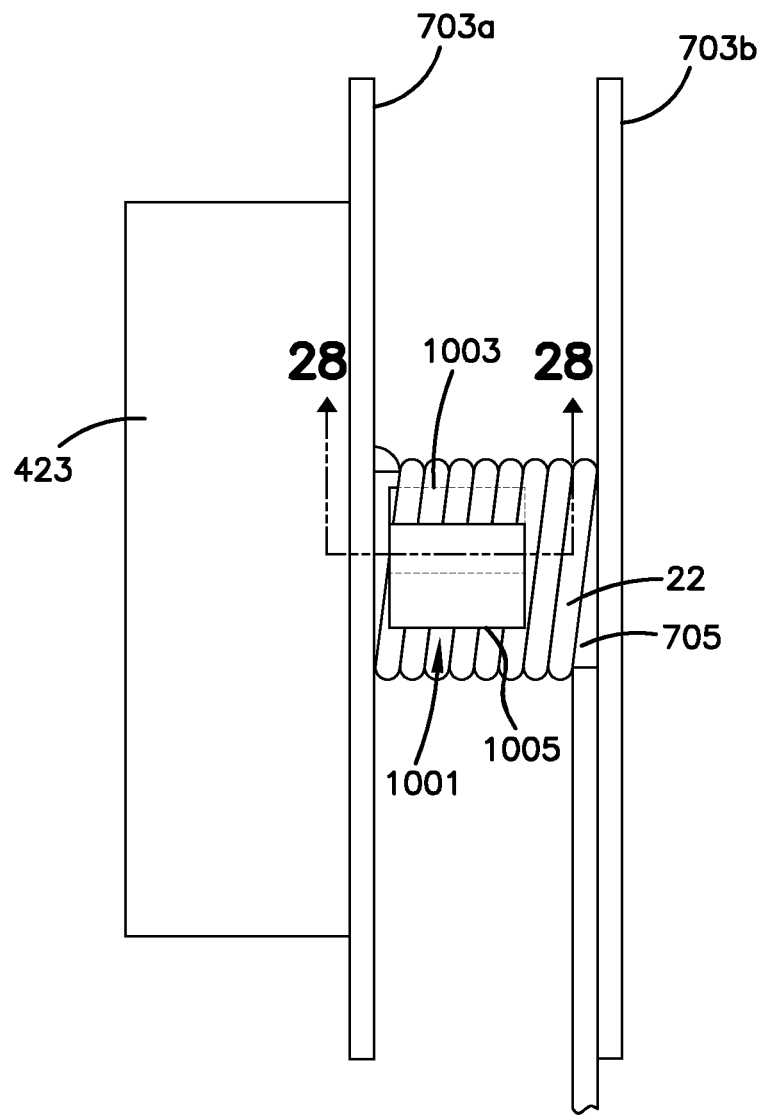
FIG. 27 is a side view of the cable spool assembly of FIG. 21 with an alternate embodiment of a strain relief member.
Figure 28:
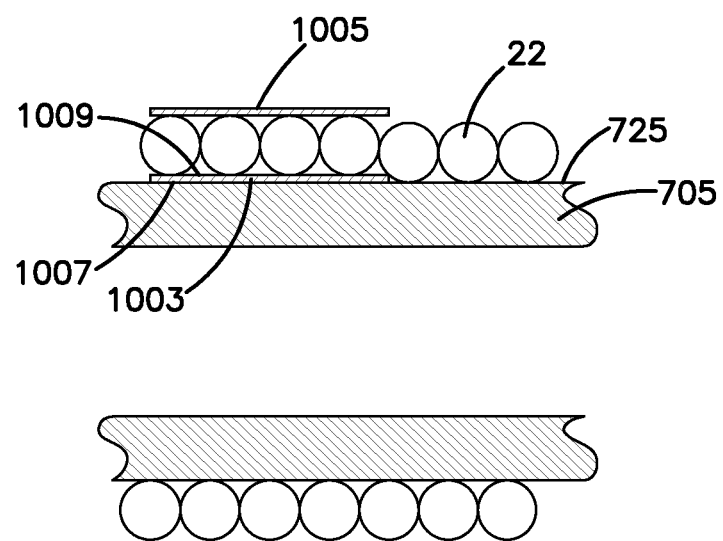
FIG. 28 is a cross-sectional view of the cable spool assembly of FIG. 27 taken on line 28-28 of FIG. 27.

Referring now to FIGS. 27 and 28, an alternate embodiment an adhesive strain relief arrangement 1001 is shown. The adhesive strain relief arrangement 1001 includes a first adhesive sheet 1003 and a second adhesive sheet 1005. The first adhesive sheet 1003 includes a first adhesive side 1007, which is disposed immediately adjacent to the outer surface 725 of the drum portion 705, and an oppositely disposed second adhesive side 1009. An inner portion of the first layer of subscriber cable 22 that is coiled or wrapped around the drum portion 705 is disposed on the second adhesive side 1009 and releasably affixed to the second adhesive side 1009. This releasable affixation of the portion of the first layer of the subscriber cable 22 to the second adhesive side 1009 of the adhesive sheet 1003 decreases the spinning speed of the cable spool assembly 701 as the subscriber cable 22 approaches its total payout length by providing resistance to the removal of that remaining portion of the subscriber cable 22 from the drum portion 705.

With the first layer of subscriber cable 22 coiled or wound around the drum portion 705 of the cable spool assembly 701, the second adhesive sheet 1005, having at least one side with an adhesive layer, is adhered to an outer portion of the first layer of subscriber cable 22. In one embodiment, the second adhesive sheet 1005 is angularly offset from the first adhesive sheet 1003.

Figure 29:
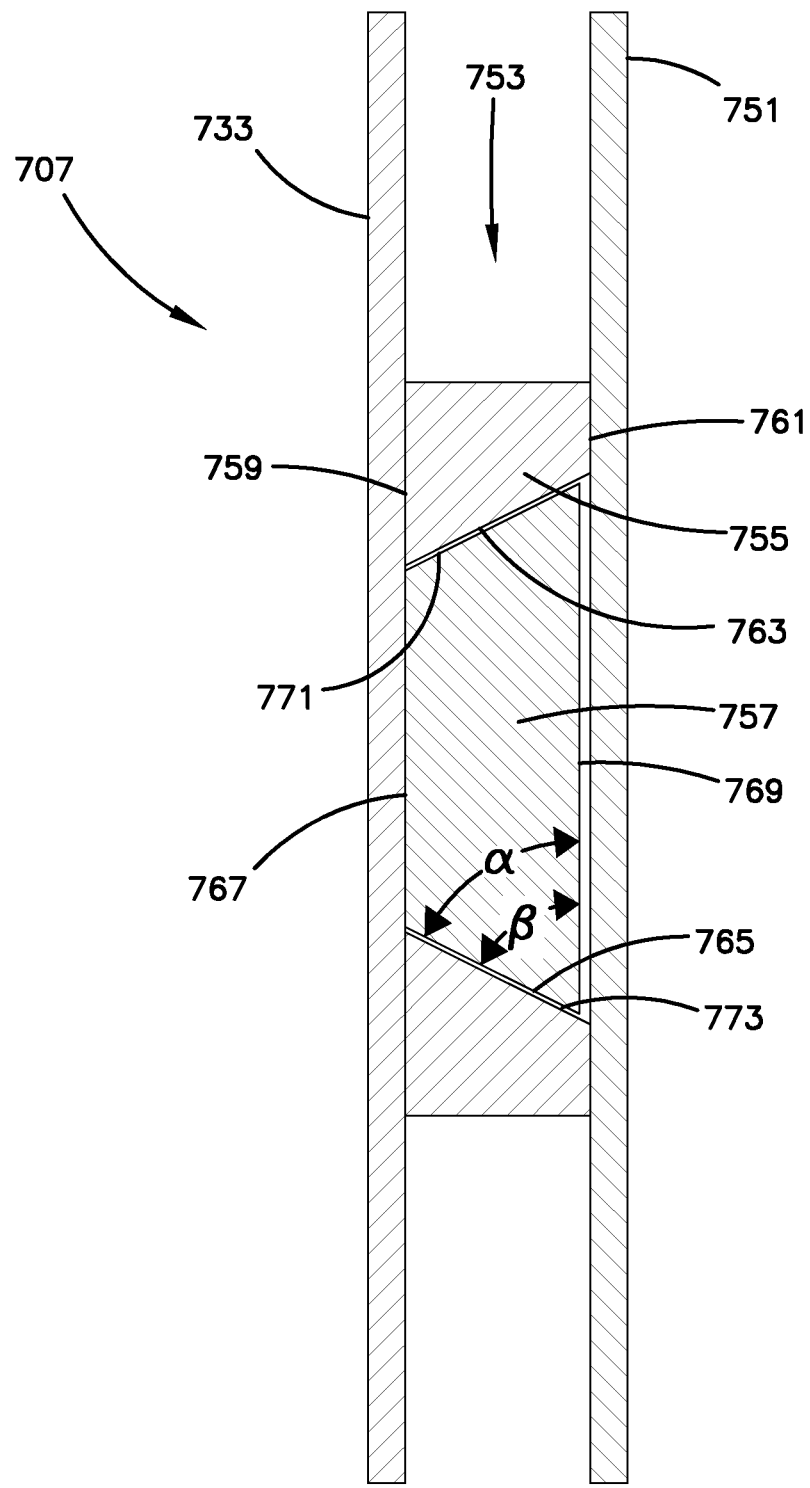
FIG. 29 is a cross-sectional view of the mounting assembly of FIG. 21.

Referring now to FIGS. 22 and 29, the mounting assembly 707 will be described. The mounting assembly includes the first plate 733, a second plate 751, and a bearing assembly 753.

In the subject embodiment, the bearing assembly 753 is a simple or plain bearing. It will be understood, however, that the bearing assembly 753 is not limited to being a simple or plain bearing. The bearing assembly 753 includes a ring member 755 and a puck member 757. In one embodiment, the bearing assembly 753 is manufactured from a general purpose polycarbonate material. In another embodiment, the bearing assembly is molded from a thermoplastic polyester resin, such as Valox resins.

The ring member 755 includes a first surface 759, an oppositely disposed second surface 761. In the subject embodiment, the first and second surfaces 759, 761 are generally planar. The second surface 761 is adapted for engagement with the second plate 751 of the mounting assembly 707.

The ring member 755 defines an inner bore 763 having a bearing surface 765. The bearing surface 765 is disposed at angle $\alpha$, which is measured from the second surface 761 as shown in FIG. 29. In the subject embodiment, the angle $\alpha$ is an oblique angle less than about 90 degrees. In another embodiment, the angle $\alpha$ is in the range of about 30 degrees to about 75 degrees. In another embodiment, the angle $\alpha$ is in the range of about 45 degrees to about 60 degrees.

The puck member 757 includes a first end surface 767, an oppositely disposed second end surface 769, and a mating bearing surface 771. In the subject embodiment, the first and second end surfaces 767, 769 are generally planar. The first end surface 767 is adapted for engagement with the first plate 733 of the mounting assembly 707.

The mating bearing surface 771 is adapted to engage the bearing surface 765 of the ring member 755 in sliding contact. The mating bearing surface 771 is disposed at an angle $\beta$, which is measured from the plane in which the second end surface 769 is disposed as shown in FIG. 29. In the subject embodiment, the angle $\beta$ is about equal to the angle $\alpha$. In another embodiment, the angle $\beta$ is an oblique angle less than about 90 degrees. In another embodiment, the angle $\beta$ is in the range of about 30 degrees to about 75 degrees. In another embodiment, the angle $\beta$ is in the range of about 45 degrees to about 60 degrees.

In the subject embodiment, an outer periphery of the puck member 757 is sized slightly smaller than the inner bore 763 of the ring member 755. This difference in size between the outer periphery of the puck member 757 and the inner bore 763 of the ring member 755 creates a clearance 773 between the ring member 755 and the puck member 757. This clearance 773 allows for rotation of the puck member 757 in the ring member 755 following dimensional expansion of the outer periphery of the puck member 757, which results from heat generated from rotation of the puck member 757 in the ring member 755. In one embodiment, the clearance 773 is filled with silicon grease or other lubricant to reduce the amount of heat generated.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A fiber optic assembly for providing optical fiber connections comprising:

a mounting plate;

at least one cable storage arrangement operatively mounted to the mounting plate so that the cable storage arrangement can rotate relative to the mounting plate about an axis, the cable storage arrangement defining a cable storage area and including a first curved surface and a second surface, the second surface spaced from the mounting plate and substantially parallel to the mounting plate;

a fiber optic termination arrangement disposed on a third surface, the third surface facing away from the mounting plate, the fiber optic termination arrangement including a plurality of fiber optic adapters, the second surface being disposed between the third surface and the first curved surface;

each of the fiber optic adapters having a first port and a second port;

the at least one cable storage arrangement and the fiber optic termination arrangement operatively connected so that the fiber optic termination arrangement rotates in unison with the at least one cable storage arrangement;

a cable management structure disposed on the third surface, the cable management structure defining a cable routing path and providing optical fiber bend radius protection; and a fiber optic cable stored in the cable storage arrangement, the fiber optic cable having a plurality of individual fibers, each of the individual fibers having a connectorized end, the connectorized ends being routed to the first ports of the plurality of adapters.

2. A fiber optic assembly as claimed in claim 1, wherein the cable storage arrangement includes a cable storage spool that defines the cable storage area.

3. A fiber optic assembly as claimed in claim 2, wherein the first curved surface forms a drum of the cable storage spool and the second surface forms a flange of the cable storage spool.

4. A fiber optic assembly as claimed in claim 3, wherein the third surface is part of an enclosure.

5. A fiber optic assembly as claimed in claim 1, wherein the second surface faces the mounting plate.

6. A fiber optic assembly as claimed in claim 1, further comprising a fanout that breaks out the fiber optic cable into the individual fibers having connectorized ends.

7. A fiber optic assembly as claimed in claim 6, wherein the fanout is disposed on the third surface.

8. A fiber optic assembly as claimed in claim 1, wherein the fiber optic adapters are disposed in a plurality of sliding adapter modules, and wherein each of the sliding adapter modules is slidable along a line substantially parallel to the axis.

9. A fiber optic assembly as claimed in claim 1, further comprising a cable storage fixing arrangement for selectively fixing the cable storage arrangement at a set rotational position relative to the mounting plate.

10. A fiber optic assembly as claimed in claim 9, wherein the cable storage fixing arrangement includes a bracket mounted to the housing and mounting plate.

11. A fiber optic assembly as claimed in claim 1, wherein insertion axes of the first and second ports of the fiber optic adapters extend parallel with the third surface.

12. A fiber optic assembly as claimed in claim 3, wherein the third surface is spaced from the flange.

13. A fiber optic assembly as claimed in claim 4, wherein the enclosure includes a base and a cover that is pivotally engaged with the base.

14. A fiber optic assembly as claimed in claim 4, wherein the enclosure includes a base, a first sidewall, and an oppositely disposed second sidewall that extend outwardly from the base.

15. A fiber optic assembly as claimed in claim 14, wherein the base, the first sidewall, and the second sidewall cooperatively define an interior region in which the fiber optic adapters are disposed.

16. A fiber optic assembly as claimed in claim 1, wherein sidewalls are disposed on opposite sides of the fiber optic termination arrangement, and a front piece is positionable to extend between the sidewalls in front of the fiber optic termination arrangement, the front piece extending across the fiber optic adapters when positioned in front of the fiber optic termination arrangement.

17. A fiber optic assembly as claimed in claim 16, wherein the front piece is a cover pivotally mounted to one of the sidewalls.

18. A fiber optic assembly as claimed in claim 1, wherein the fiber optic adapters are configured to slide in a direction transverse to the third surface.

* * * * *